() United States Patent  (10) Patent No.: US 7,815,545 B2
Nakashima et al.  (45) Date of Patent: Oct. 19, 2010

(54) HYDRAULIC CONTROL SYSTEM FOR AUTOMATIC TRANSMISSION

(75) Inventors: Kenji Nakashima, Shizuoka (JP); Masaaki Uchida, Kanagawa (JP); Yoshinobu Kawamoto, Kanagawa (JP)

(73) Assignee: Jatco Ltd, Fuji-shi (JP)

( * ) Notice: Subject to any disclaimer, the term of this patent is extended or adjusted under 35 U.S.C. 154(b) by 991 days.

(21) Appl. No.: 11/347,299

(22) Filed: Feb. 6, 2006

(65) Prior Publication Data
US 2006/0189436 A1 Aug. 24, 2006

(30) Foreign Application Priority Data
Feb. 22, 2005 (JP) ............................. 2005-046129

(51) Int. Cl.
F16H 61/32 (2006.01)
(52) U.S. Cl. ...................................... 477/138; 477/156
(58) Field of Classification Search ................. 477/127, 477/130, 138, 156
See application file for complete search history.

(56) References Cited
U.S. PATENT DOCUMENTS
5,908,370 A * 6/1999 Kubo et al. ................. 477/144
6,411,881 B1 * 6/2002 Thomas ........................ 701/67
7,335,133 B2 * 2/2008 Katou et al. ................. 477/167
2003/0197385 A1 * 10/2003 Onoyama et al. .......... 290/40 R
2004/0157700 A1 * 8/2004 Katou .......................... 477/45

FOREIGN PATENT DOCUMENTS
JP 2000-266172 A 9/2000

* cited by examiner

Primary Examiner—David D Le
Assistant Examiner—Derek D Knight
(74) Attorney, Agent, or Firm—Foley & Lardner LLP

(57) ABSTRACT

An automatic transmission hydraulic control apparatus includes an oil pump driven by an engine, a forward clutch arranged to be engaged by an engagement pressure from the oil pump at a start of the vehicle, a hydraulic pressure sensing section configured to sense a hydraulic pressure in the automatic transmission, a filling start judging section configured to judge a start of filling to the forward clutch in accordance with the sensed hydraulic pressure; and an engagement pressure control section configured to control the engagement pressure to go through a filling phase and an engagement phase. The engagement pressure control section shifts from the filling phase to the engagement phase when a predetermined time elapses from the judgment of the start of the filling to the forward clutch.

17 Claims, 13 Drawing Sheets

HYDRAULIC CONTROL SYSTEM FOR AUTOMATIC TRANSMISSION

BACKGROUND OF THE INVENTION

The present invention relates to a hydraulic control system for an automatic transmission capable of an idling stop control, and more especially to a hydraulic control system for a continuously-variable transmission.

Japanese Patent Application Publication No. 2000-266172 shows an idling stop control system configured to perform engagement control of a forward clutch (N-D select control) by shifting to an engagement phase when an end of a filling phase is detected in accordance with the engine speed after an engine restart.

SUMMARY OF THE INVENTION

However, in the above-mentioned control apparatus, a line pressure can not be increased sufficiently until a first explosion of the engine in a case in which a cranking is performed by a starter at an engine speed lower than an idle speed, so that supply of oil to the forward clutch is retarded. Therefore, it is not possible to estimate an end of filling accurately.

It is an object of the present invention to provide a shift control apparatus and/or method for an automatic transmission configured to set an optimal engagement timing in accordance with a filling end, and to start a vehicle without causing an unnatural feeling to a driver.

According to one aspect of the present invention, a hydraulic control apparatus for an automatic transmission of a vehicle, the control apparatus comprises: an oil pump driven by an engine; a forward clutch arranged to be changed over from a disengagement state to an engagement state by an engagement pressure from the oil pump at a start of the vehicle; an idling stop control section configured to stop the engine at a stop of the vehicle when a predetermined condition is satisfied, and to restart the engine when the predetermined condition is not satisfied; a hydraulic pressure sensing section configured to sense a hydraulic pressure in the automatic transmission; a filling start judging section configured to judge a start of filling to the forward clutch in accordance with the sensed hydraulic pressure; and an engagement pressure control section configured to control the engagement pressure to output a filling pressure command value until an end of a piston stroke of the forward clutch in a filling phase, and then to hold clutch plates in a slip state after the end of the piston stroke of the forward clutch in an engagement phase when the forward clutch is changed over from the disengagement state to the engagement state, and to shift from the filling phase to the engagement phase when a predetermined time elapses from the judgment of the start of the filling to the forward clutch.

According to another aspect of the invention, a hydraulic control apparatus for an automatic transmission of a vehicle, the control apparatus comprises: an oil pump driven by an engine; a forward clutch arranged to be changed over from a disengagement state to an engagement state by an engagement pressure from the oil pump at a start of the vehicle; an idling stop control section configured to stop the engine at a stop of the vehicle when a predetermined condition is satisfied, and to restart the engine when the predetermined condition is not satisfied; an engine speed sensing section configured to sense an engine speed; a filling start judging section configured to judge a start of filling to the forward clutch when the sensed engine speed is greater than a complete explosion judging engine speed and when an integrated value of the sensed engine speed is greater than an engine complete explosion judging total rotation number; and an engagement pressure control section configured to control the engagement pressure to output a filling pressure command value until an end of a piston stroke of the forward clutch in a filling phase, and then to hold clutch plates in a slip state after the end of the piston stroke of the forward clutch in an engagement phase when the forward clutch is changed over from the disengagement state to the engagement state, and to shift from the filling phase to the engagement phase when a predetermined time elapses from the judgment of the start of the filling to the forward clutch.

According to still another aspect of the invention, a hydraulic control method for an automatic transmission of a vehicle including an oil pump driven by an engine, and a forward clutch arranged to be changed over from a disengagement state to an engagement state by an engagement pressure from the oil pump at a start of the vehicle, the control method comprises: stopping the engine at a stop of the vehicle when a predetermined condition is satisfied; restarting the engine when the predetermined condition is not satisfied; sensing a hydraulic pressure in the automatic transmission; judging a start of filling to the forward clutch in accordance with the sensed hydraulic pressure; and controlling the engagement pressure to output a filling pressure command value until an end of a piston stroke of the forward clutch in a filling phase, and then to hold clutch plates in a slip state after the end of the piston stroke of the forward clutch in an engagement phase when the forward clutch is changed over from the disengagement state to the engagement state, and shifting from the filling phase to the engagement phase when a predetermined time elapses from the judgment of the start of the filling to the forward clutch.

DETAILED DESCRIPTION OF THE INVENTION

Figure 1:
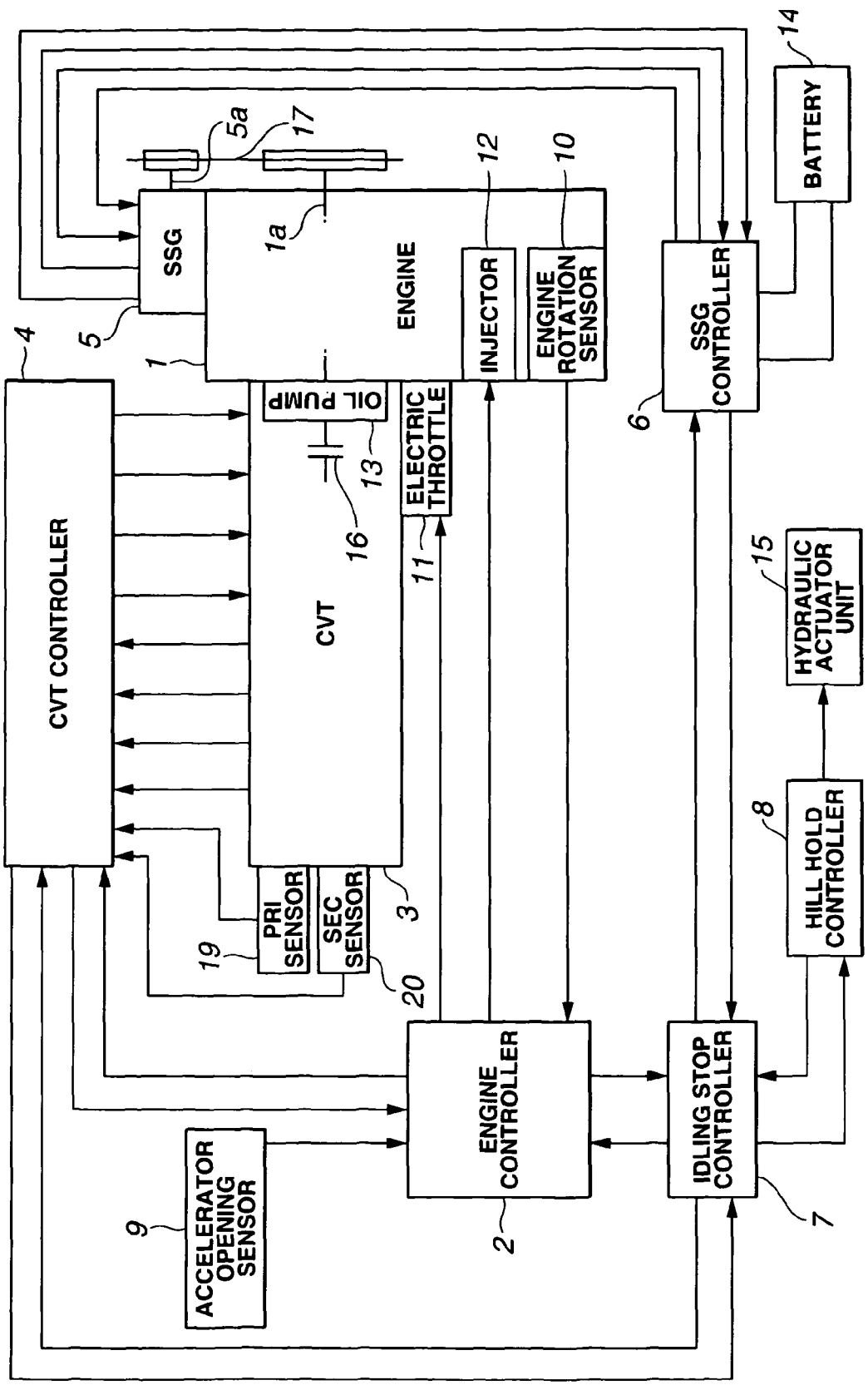
FIG. 1 is a view showing a driving system for a vehicle provided with a belt-type continuously-variable transmission according to a first embodiment of the present invention.

FIG. 1 shows a driving system for a vehicle, provided with a belt-type continuously-variable transmission according to a first embodiment of the present invention. This driving system for the vehicle includes an engine 1; an engine controller 2 to control engine 1; a belt-type continuously-variable transmission (CVT) 3; a CVT controller 4 to control CVT 3; a motor generator (SSG) 5 to start engine 1; a SSG controller 6 to control SSG 5, an idling stop controller (idling stop control section) 7 to judge permission and inhibition of idling stop, and a hill hold controller (or hill hold control section) 8 to control hill hold.

Engine 1 includes an engine rotation sensor (or engine speed sensing section) 10, an electric throttle 11, and an injector 12. Engine controller 2 senses an engine rotational position and an engine speed by an engine rotation signal (CAN signal) from engine rotation sensor 10.

Engine controller 2 receives the signals from the above-mentioned sensor, and further receives an engine torque limit signal from CVT controller 4. Engine controller 2 outputs an electric throttle opening control signal to electric throttle 11, an injector control signal to injector 12, and the engine rotation signal to CVT controller 4 in accordance with the inputted parameters. Engine controller 2 outputs the engine rotational signal, an accelerator opening, and idling stop permission signal, and signals such as an engine water temperature to idling stop controller 7, in accordance with the inputted parameters.

CVT controller 4 receives the engine rotation signal. CVT controller 4 receives a shift position, an oil temperature (ATF temperature) of oil supplied to CVT 3, a primary pressure sensor value, and a secondary pressure sensor value from CVT 3. CVT controller 4 outputs a primary solenoid current, a secondary solenoid current, a line pressure solenoid current, and an clutch solenoid current to CVT 3, in accordance with the inputted parameters. CVT controller 4 outputs the engine torque limit signal, a range, the oil temperature, and the idling stop permission signal to engine controller 2, in accordance with the inputted parameters.

SSG controller 6 receives a cranking signal from idling stop controller 7 and a motor generator rotation signal from SSG 5. SSG controller 6 outputs a motor generator current to SSG 5 in accordance with the inputted parameters. SSG controller 6 outputs the motor generator rotation signal, a fail signal, and a battery voltage of battery 14 to idling stop controller 7, in accordance with the inputted parameters.

Idling stop controller 7 receives the signals from engine controller 2 and CVT controller 4. Idling stop controller 7 receives the motor generator rotational signal, the fail signal, and the battery voltage from SSG controller 6. Idling stop controller 7 receives a brake signal from hill hold controller 8. Idling stop controller 7 outputs the idling stop signal to engine controller 2 and CVT controller 4 in accordance with inputted parameters. Idling stop controller 7 outputs a hill hold command and the cranking signal to hill hold controller 8 in accordance with inputted parameters.

When idling stop controller 7 judges the idling stop, the command to stop the engine is outputted to engine controller 2. When idling stop controller 7 judges the engine restart after the idling stop, a command to restart the engine is outputted to engine controller 2. Then, engine controller 2 outputs the motor driving signal to SSG 5 to start engine 1.

Hill hold controller 8 receives the hill hold command, and outputs the hill hold command to a hydraulic actuator unit 15 to regulate brake hydraulic pressure of each brake. Accordingly, the brake hydraulic pressure is held at the idling stop on the slope, and it is possible to prevent the vehicle from being moved backwards in accordance with the stop of the engine. Idling stop controller 7 supplies the idling stop command to engine controller 2 after the hill hold operation is finished, and stops the engine rotation.

A crank shaft 1a of engine 1 is connected through an oil pump 13 and a torque converter (not shown) with a running clutch (forward clutch) 16 of CVT 3. Running clutch 16 varies the rotational direction of engine 1 by engaging the advance (forward) clutch at the advance of vehicle and by engaging the reverse clutch (or brake) at the reverse of vehicle, and transmits the varied rotational direction of engine 1 to CVT 3. Crank shaft 1a and a motor generator output shaft 5a transmit power by a belt 17.

Oil pump 13 is driven only by engine 1. There are no other oil pumps to supply the hydraulic pressure to CVT 3. Accordingly, when engine 1 is stopped, oil pump 13 cannot supply the hydraulic pressure, and the oil is drawn from a piston 16a of running clutch 16.

Figure 2:
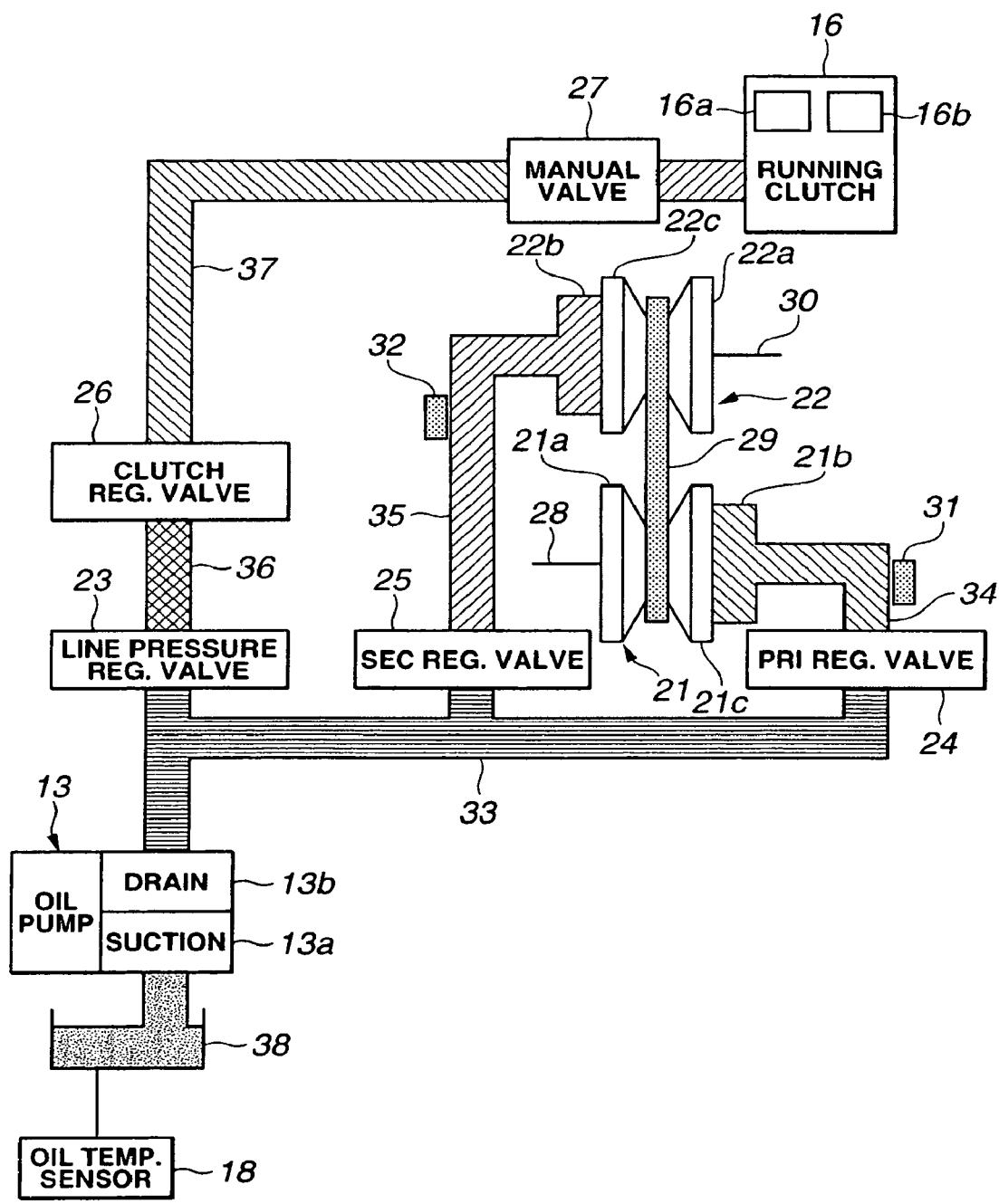
FIG. 2 is a view showing a hydraulic circuit system for a CVT 3 of FIG. 1.

FIG. 2 shows a hydraulic circuit structure of CVT 3 according to a first embodiment of the present invention. CVT 3 includes a primary pulley 21, a secondary pulley 22, a line pressure regulating valve 23, a primary pulley pressure regulating valve (or pulley pressure regulator section) 24, a secondary pulley pressure regulating valve (or pulley pressure regulator section) 25, a clutch pressure regulating valve 26, and a manual valve 27.

Primary pulley 21 is connected through a transmission input shaft 28 with running clutch 16. Rotational force of primary pulley 21 is transmitted through a belt 29 to secondary pulley 22 connected with a follower shaft 30.

Primary pulley 21 includes a fixed conical disk 21a and a movable conical disk 21c. Fixed conical disk 21a rotates as a unit with transmission input shaft 28. Movable conical disk 21c is disposed at a position to confront fixed conical disk 21a so as to form a V-shaped groove with fixed conical disk 21a. Movable conical disk 21c is arranged to be moved in an axial direction of transmission input shaft 28 by hydraulic pressure applied to a primary pulley cylinder chamber 21b.

Secondary pulley 22 includes a fixed conical disk 22a and a movable conical disk 22c. Fixed conical disk 22a rotates as a unit with follower shaft 30. Movable conical disk 22c is disposed at a position to confront fixed conical disk 22a so as to form a V-shaped groove with fixed conical disk 22a. Movable conical disk 22c is arranged to be moved in an axial direction of follower shaft 30 by hydraulic pressure applied to a secondary pulley cylinder chamber 22b.

A drive gear (not shown) is fixed to follower shaft 30. The drive gear drives a drive shaft (not shown) connected with wheel or wheels (not shown), through pinions provided on an idler shaft, a final gear, and a differential.

The rotational force inputted to CVT 3 is transmitted through the torque converter and running clutch 16 to transmission input shaft 28. The rotational force of transmission input shaft 28 is transmitted, through primary pulley 21, belt 29, secondary pulley 22, follower shaft 30, the drive gear, the idler gear, the idler shaft, the pinions, and the final gear, to the differential.

In this case of transmitting the power, movable conical disk 21c of primary pulley 21 and movable conical disk 22c of secondary pulley 22 are moved in the axial direction to vary each contact position radius with belt 29, and thereby a rotation ratio (speed ratio or transmission ratio) between primary pulley 21 and secondary pulley 22 can be varied. Control for varying a width of the V-shaped pulley groove is operated through CVT controller 4 by the hydraulic control to primary pulley cylinder chamber 21b or secondary pulley cylinder chamber 22b.

CVT controller 4 receives the accelerator opening from an accelerator pedal opening sensor (or accelerator input quantity sensing section) 9 through engine controller 2. CVT controller 4 receives the oil temperature from an oil temperature sensor (or oil temperature sensing section) 18, a primary pulley rotational speed from a primary pulley rotational speed sensor 19 provided with primary pulley 21, a secondary pulley rotational speed from a secondary pulley rotational speed sensor 20 provided with secondary pulley 22, and so on. CVT controller 4 determines or calculates control signals in accordance with the input parameters, and then outputs each control signal to a hydraulic control valve unit (not shown) of CVT 3.

In these control signals, a line pressure command signal (or line pressure command value) is supplied to line pressure regulating valve 23. A primary pulley pressure command signal (or primary pulley pressure command value) is supplied to primary pulley pressure regulating valve 24. A secondary pulley pressure command signal (or secondary pulley pressure command value) is supplied to secondary pulley pressure regulating valve 25. A clutch pressure command signal (or clutch pressure command value) is supplied to clutch pressure regulating valve 26.

The line pressure command value is supplied to a solenoid of line pressure regulating valve 23 as the line pressure solenoid current. The primary pulley pressure command value is supplied to a solenoid of primary pulley pressure regulating valve 24 as the primary solenoid current. The secondary pulley pressure command value is supplied to a solenoid of secondary pulley pressure regulating valve 25 as the secondary solenoid current. The clutch pressure command value is supplied to a solenoid of clutch pressure regulating valve 26 as the clutch solenoid current.

Oil pump 13 sucks the oil stored in an oil pan 38 from an inlet port or suction port 13a, and then discharges the oil from an outlet port or drain port 13b to a line pressure circuit 33 in accordance with the rotational speed of crank shaft 1a.

Line pressure regulating valve decompresses or decreases the discharge pressure discharged from drain port 13b of oil pump 13 in accordance with the line pressure solenoid current, and generates a predetermined line pressure (pulley cramping pressure). The generated line pressure is supplied through line pressure circuit 33 to primary pulley regulating valve 24 and secondary pulley pressure regulating valve 25. The oil drained from line pressure regulating valve 23 is discharged as a clutch source pressure to a clutch source pressure circuit 36.

Primary pulley pressure regulating valve 24 regulates the line pressure in accordance with the primary solenoid current, and supplies the hydraulic pressure through a primary pressure circuit 34 to primary pulley cylinder chamber 21b. Primary pulley pressure circuit 34 is provided with a primary pulley pressure sensor 31 configured to sense an actual primary pulley pressure. CVT controller 4 refers to the actual primary pulley pressure sensed by primary pulley pressure sensor 31, and thereby controls the primary pulley pressure in the mode of feedback control.

Secondary pulley pressure regulating valve 25 regulates the line pressure in accordance with the secondary solenoid current, and supplies the hydraulic pressure through a secondary pressure circuit 35 to secondary pulley cylinder chamber 22b. Secondary pulley pressure circuit 35 is provided with a secondary pulley pressure sensor (hydraulic pressure sensing section) 32 configured to sense an actual secondary pulley pressure. CVT controller 4 refers to the actual secondary pulley pressure sensed by secondary pulley pressure sensor 32, and thereby controls the secondary pulley pressure in the mode of feedback control.

Clutch pressure regulating valve 26 generates the clutch pressure by reducing the clutch source pressure in accordance with the clutch solenoid current, and outputs the generated clutch pressure to a clutch pressure circuit 37. Manual valve 27 supplies the clutch pressure to forward clutch 16 in accordance with select lever operation by the driver. In a case in which a forward range is selected, the clutch pressure is applied to the forward clutch. In a case in which a reverse range is selected, the clutch pressure is supplied to the reverse clutch. In a case in which a neutral range is selected, the clutch pressure is not supplied to running clutch 16, and is drained to oil pan 38.

Figure 3:
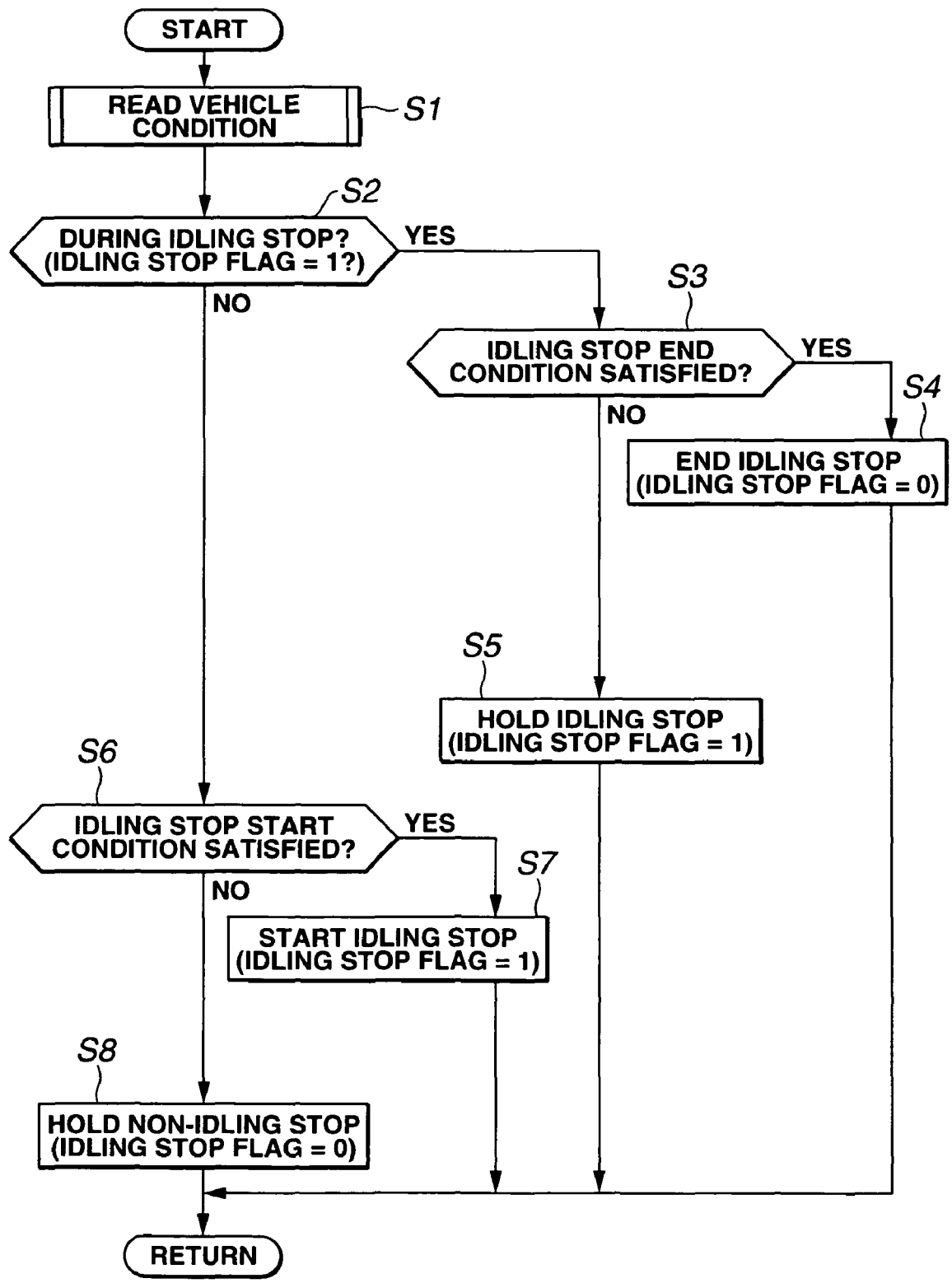
FIG. 3 is a flow chart showing a flow of the idling stop start-end judging control operation performed by an idling stop controller 7.

FIG. 3 shows a flow chart showing flow of idling stop start-end judging operation performed by idling stop controller 7. Hereinafter, each step is illustrated. This control operation is performed by a predetermined control cycle.

At step S1, idling stop controller 7 reads a vehicle condition, and then the process proceeds to step S2.

At step S2, idling stop controller 7 judges whether the idling stop is performed or not by judging whether the idling stop flag is one (ON) or not. When the answer of step S2 is affirmative (YES), the process proceeds to step S3 When the answer of step S2 is negative (NO), the process proceeds to step S6.

Subsequently to step S2, at step S3, idling stop controller 7 judges whether the idling stop end condition is satisfied or not. When the answer of step S3 is YES, the process proceeds to step S4. When the answer of step S3 is NO, the process proceeds to step S5. In this operation, the idling stop end condition is satisfied when at least one of first, second, third, and fourth conditions is met. The first condition is met when the idling stop switch is OFF. The second condition is met when the vehicle speed is not zero. The third condition is met when the brake pedal is not compressed (the brake switch is OFF). The fourth condition is met when the steering angle is equal to or more than a predetermined angle.

At step S4, idling stop controller 7 sets the idling stop flag to zero (OFF) to end the idling stop operation, and the process proceeds to the return.

At step S5, idling stop controller 7 holds the idling stop flag at one to keep the idling stop operation, the process proceeds to the return.

At step S6, idling stop controller 7 judges whether the idling stop start condition is satisfied or not. When the answer of step S6 is YES, the process proceeds to step S7. When the answer of step S6 is NO, the process proceeds to step S8. In this operation, the idling stop start condition is satisfied when all of fifth, sixth, seventh, and eighth conditions are met. The fifth condition is met when the idling stop switch is ON. The sixth condition is met when the vehicle speed is zero. The seventh condition is met when the brake pedal is depressed (the brake switch is ON). The eighth condition is met when the steering angle is a predetermined angle being in the vicinity of zero.

At step S7, idling stop controller 7 sets the idling stop flag to one to start the idling stop operation, and the process proceeds to the return.

At step S8, idling stop controller 7 holds the idling stop flag at zero to keep non-idling stop operation, and the process proceeds to the return.

In the flow chart of FIG. 3, when the idling stop start condition is satisfied during the non-idling stop at step S2, idling stop controller 7 sets the idling stop flag to one at step S7. Then, idling stop controller 7 sets the hill hold flag to ON, and makes hill hold controller 8 start the hill hold operation. Next, after the hill hold operation is started, the engine stop flag is transmitted to engine controller 2. The fuel injection of injector 12 is stopped, so that the engine rotation is stopped. Then, the idling stop operation is started.

At step S3, when the idling stop end condition is satisfied during the idling stop, idling stop controller 7 sets the idling stop flag to zero at step S4. Then, the cranking command is transmitted to SSG controller 6, and the cranking is started by the SSG 5. When the engine cranking is started, engine controller 2 starts the fuel injection by injector 12. When engine speed exceeds a predetermined rotational speed, the cranking is ended on judgment of an engine complete explosion or engine starting.

CVT controller 4 performs the engagement pressure control of forward clutch 16 at the engine restart through a filling phase to output a filling phase command pressure (filling pressure command value) until an end of the clutch piston stroke, and an engagement phase to hold the slip state of clutch plates 16b after the end of the clutch piston stroke.

Figure 4:
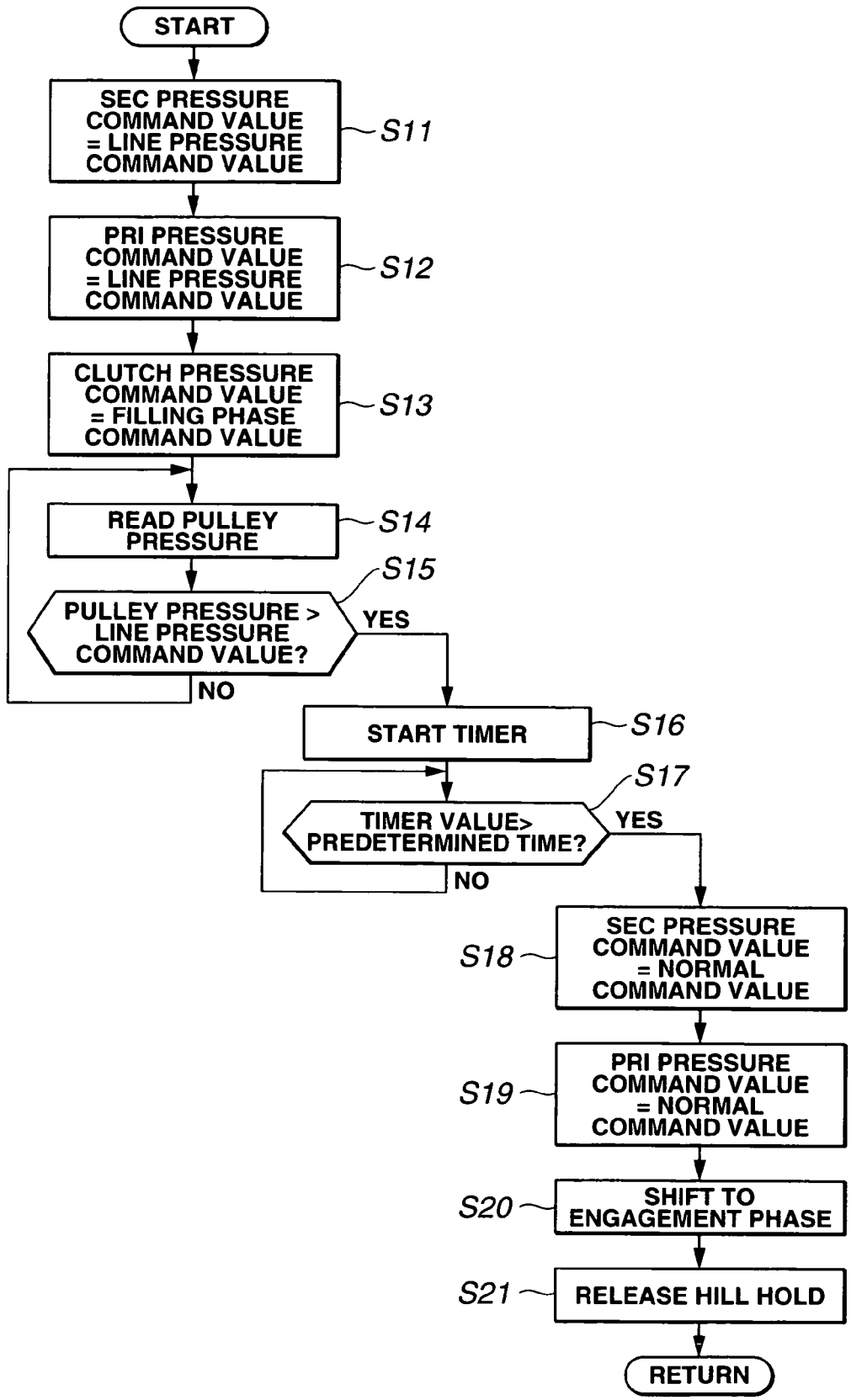
FIG. 4 is a flow chart showing a running clutch engagement control operation performed by a CVT controller 4 of FIG. 1 when the idling stop end condition is satisfied.

FIG. 4 shows a flow chart showing flow of the running clutch engaging control process performed by CVT controller 4 when the idling stop end condition is satisfied. Hereinafter, each step is illustrated. This control process is performed by a predetermined control cycle.

At step S11, CVT controller 4 sets the secondary pulley pressure command value to secondary pulley pressure regulating valve 25, to the line pressure command value to line pressure regulating valve 23. Then, the process proceeds to step S12.

At step S12, CVT controller 4 sets the primary pulley pressure command value to primary pulley pressure regulating valve 25, to the line pressure command value to line pressure regulating valve 23. Then, the process proceeds to step S13.

Figure 5:
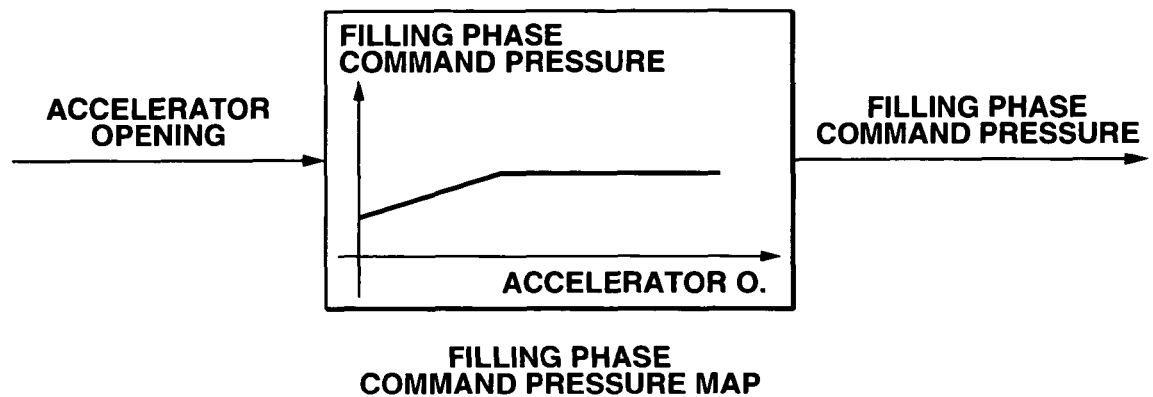
FIG. 5 is a filling phase command pressure map.

At step S13, CVT controller 4 sets the clutch pressure command value to clutch pressure regulating valve 26, to the filling phase command pressure. Then, the process proceeds to step S14. CVT controller 4 sets the filling phase command pressure in accordance with the accelerator opening by referring to the filling phase command pressure map of FIG. 5. In FIG. 5, the maximum value of the filling phase command pressure is a hydraulic pressure command value necessary to finish the piston stroke of running clutch 16. Therefore, running clutch 16 is in a state just before the start of the engagement.

At step S14, CVT controller 4 reads the pulley pressure, and the process proceeds to step S15. In the hydraulic control apparatus according to the first embodiment, CVT controller 4 reads secondary pulley pressure sensed by secondary pressure sensor 32.

Figure 6:
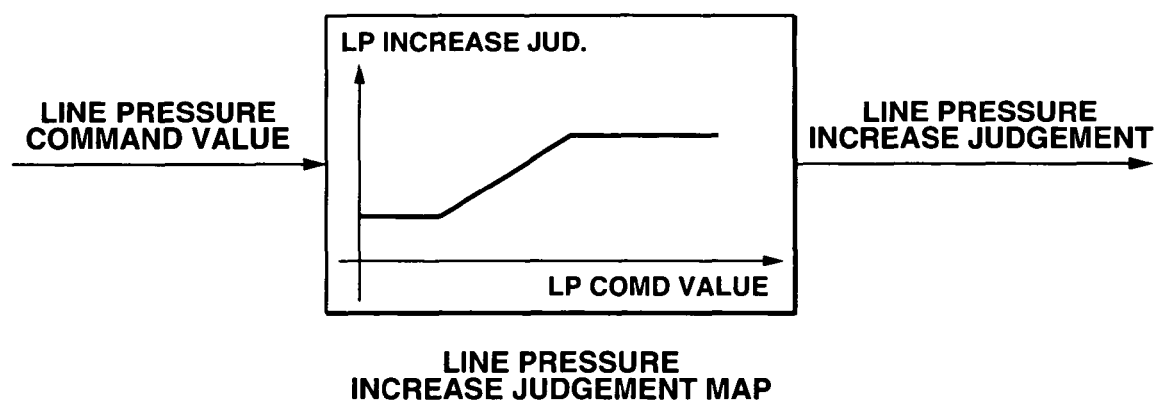
FIG. 6 is a line pressure increase judging map.

At step S15, CVT controller 4 judges whether the secondary pulley pressure read at step S14 exceeds a predetermined value (the line pressure command value) set as FIG. 6. When the answer of S15 is YES, the process proceeds to step S16. When the answer of S15 is NO, the process proceeds to step S14. Step S15 corresponds to a filling start judging section to judge the start of the filling to running clutch 16.

At step S16, CVT controller 4 starts a timer, and the process proceeds to step S17.

At step S17, CVT controller 4 judges whether a timer value exceeds a filling phase end judging time (predetermined time). When the answer of S17 is YES, the process proceeds to step S18. When the answer of step S17 is NO, the process repeats step S17. The filling phase end judging time is set in accordance with the accelerator opening, the oil temperature, the idling stop duration, the range record (history) during the idling stop, and the current range (the forward range or the reverse range).

At step S18, CVT controller 4 sets the secondary pulley pressure command value to secondary pulley pressure regulating valve 25, to the command value in a normal running state, and the process proceeds to step 19.

At step S19, CVT controller 4 sets the primary pulley pressure command value to primary pulley pressure regulating valve 24, to the command value in the normal running state, and the process proceeds to step 20.

At step S20, CVT controller 4 terminates the filling phase, and shifts to the engagement phase. Then, the process proceeds to step S21. In the engagement phase, CVT controller 4 increases the clutch pressure command value gradually from a filling pressure command pressure, and thereby the clutch is engaged. This step 20 corresponds to an engagement pressure control section configured to shift from the filling phase to the engagement phase when a predetermined time has elapsed from a judgment of the start of the hydraulic pressure supply.

At step S21, CVT controller 4 cancels the hill hold, and then the process proceeds to the return.

In the flow chart of FIG. 4, in the case of increase in the pulley pressure, the process proceeds to step S11, step S12, step S13, step S14, step S15, step S16, and step S17. At step S17, when the filling phase end judging time which is set in accordance with the accelerator opening, the oil temperature, the idling stop duration, the record of the range during the idling stop, and the current range, elapses after the pulley pressure increases, the process proceeds to step S18, step S19, and step S20. CVT controller 4 shifts to the engagement phase at step S20. Subsequently, CVT controller 4 cancels the hill hold at step S21.

Figure 7:
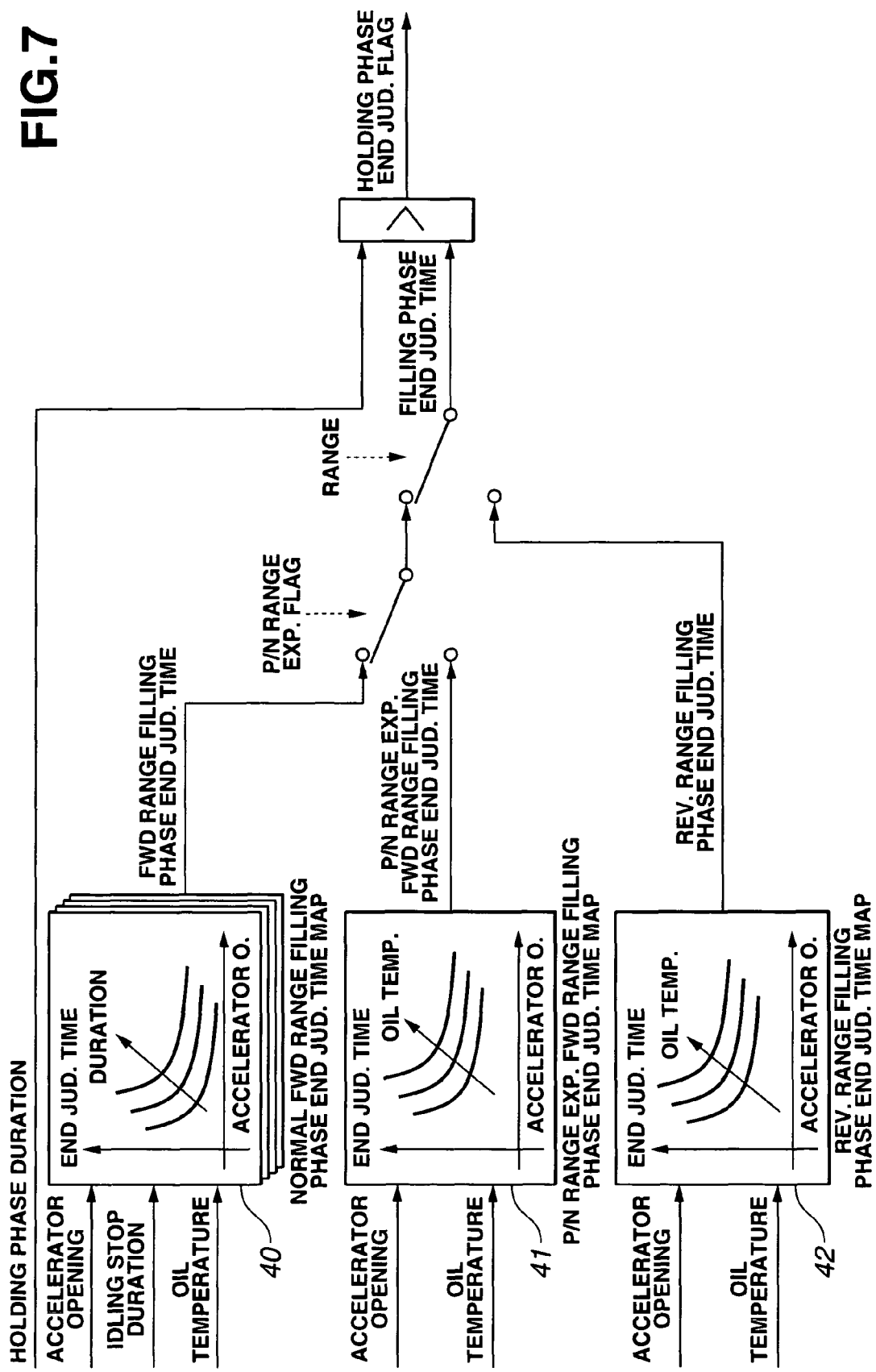
FIG. 7 is a filling phase end time judging map.

As shown in FIG. 7, when the forward range is selected, a normal forward range filling phase end judging time map 40 is used. This normal forward range filling phase end judging time map 40 sets the filling phase end judging time in the forward range (the forward range filling phase end judging time) in accordance with the accelerator opening, the idling stop duration, and the oil temperature.

When the forward range is selected in a case in which the P range or the N range has been selected at least one time during the idling stop, P/N range experience forward range filling phase end judging time map 41 is used. P/N range experience forward range filling phase end judging time map 41 sets the filling phase end judging time in the P/N range experience state in the forward range (P/N range experience forward range filling phase end judging time) in accordance with the accelerator opening and the oil temperature.

When the reverse range is selected, reverse range filling phase end judging time map 42 is used. This reverse range filling phase end judging time map 42 sets the filling phase end judging time in the reverse range (the reverse range filling phase end judging time) in accordance with the accelerator opening and the oil temperature.

Normal forward range filling phase end judging time map 40, P/N range experience forward range filling phase end judging time map 41, and reverse range filling phase end judging time map 42 are set to shorten or decrease the filling phase end judging time generally as the accelerator opening is greater.

Figure 8:
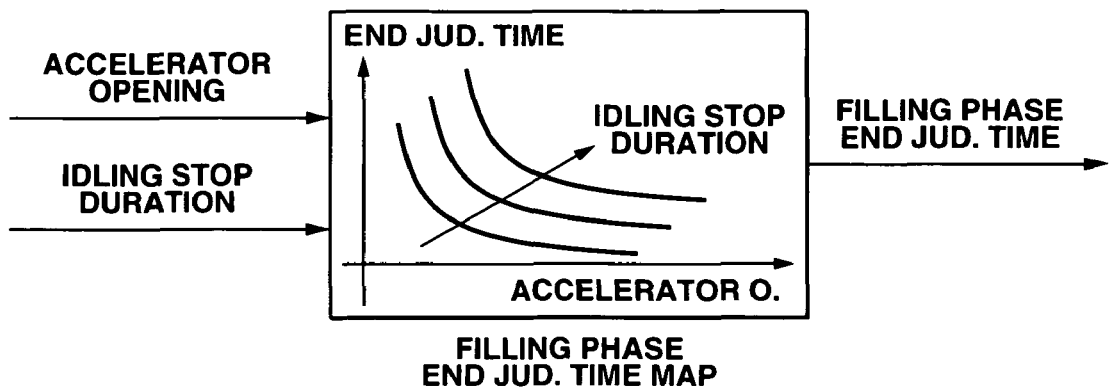
FIG. 8 is a filling phase end time judging map according to idling stop duration.

CVT controller 4 measures the idling stop duration from the stop of engine 1 to the restart. CVT controller 4 corresponds to an idling stop duration sensing section. Normal forward range filling phase end judging map 40 is set to lengthen or increase the filling phase end judging time as the idling stop duration is longer (as shown in FIG. 8).

Figure 9:
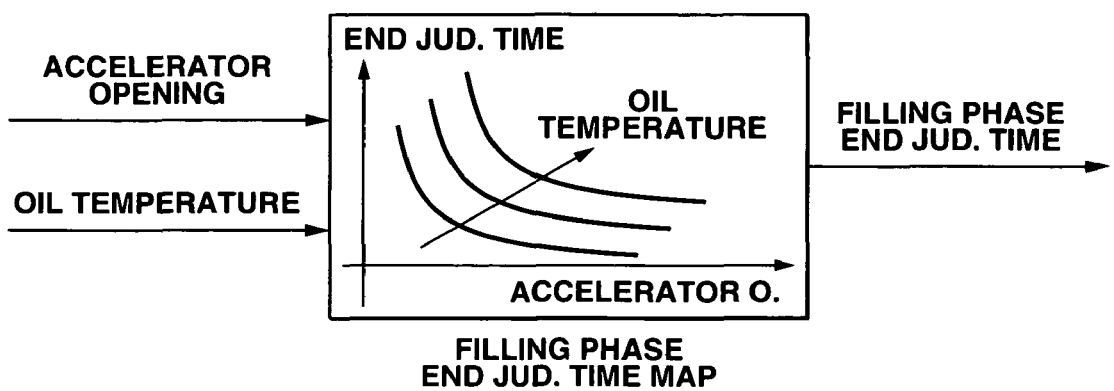
FIG. 9 is a filling phase end time judging map according to oil temperature.

Moreover, normal forward range filling phase end judging time map 40, P/N range experience forward range filling phase end judging time map 41 and reverse range filling phase end judging time map 42 vary the filling phase end judging time in accordance with the oil temperature sensed by oil temperature sensor 18 (as shown in FIG. 9).

For example, normal forward range filling phase end judging time map 40 has three maps for a low temperature state (below 40° C.), an intermediate temperature state (40~100° C.), and a high temperature state (above 100° C.), and these are changed over in accordance with the oil temperature. The filling phase end judging time is set so as to be longer in the intermediate temperature state than in the lower or high temperature state, and so as to be longer in the lower temperature state than in the high temperature state.

Figure 10:
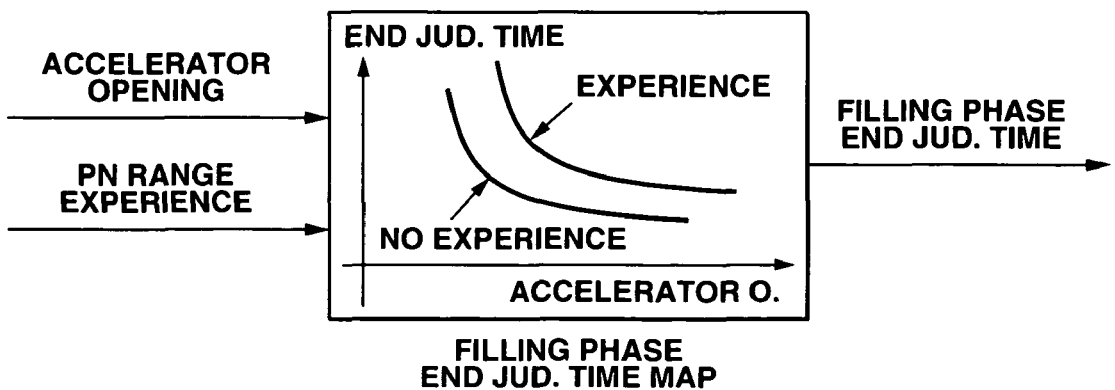
FIG. 10 is a filling phase end time judging map according to P/N range experience.
Figure 11:
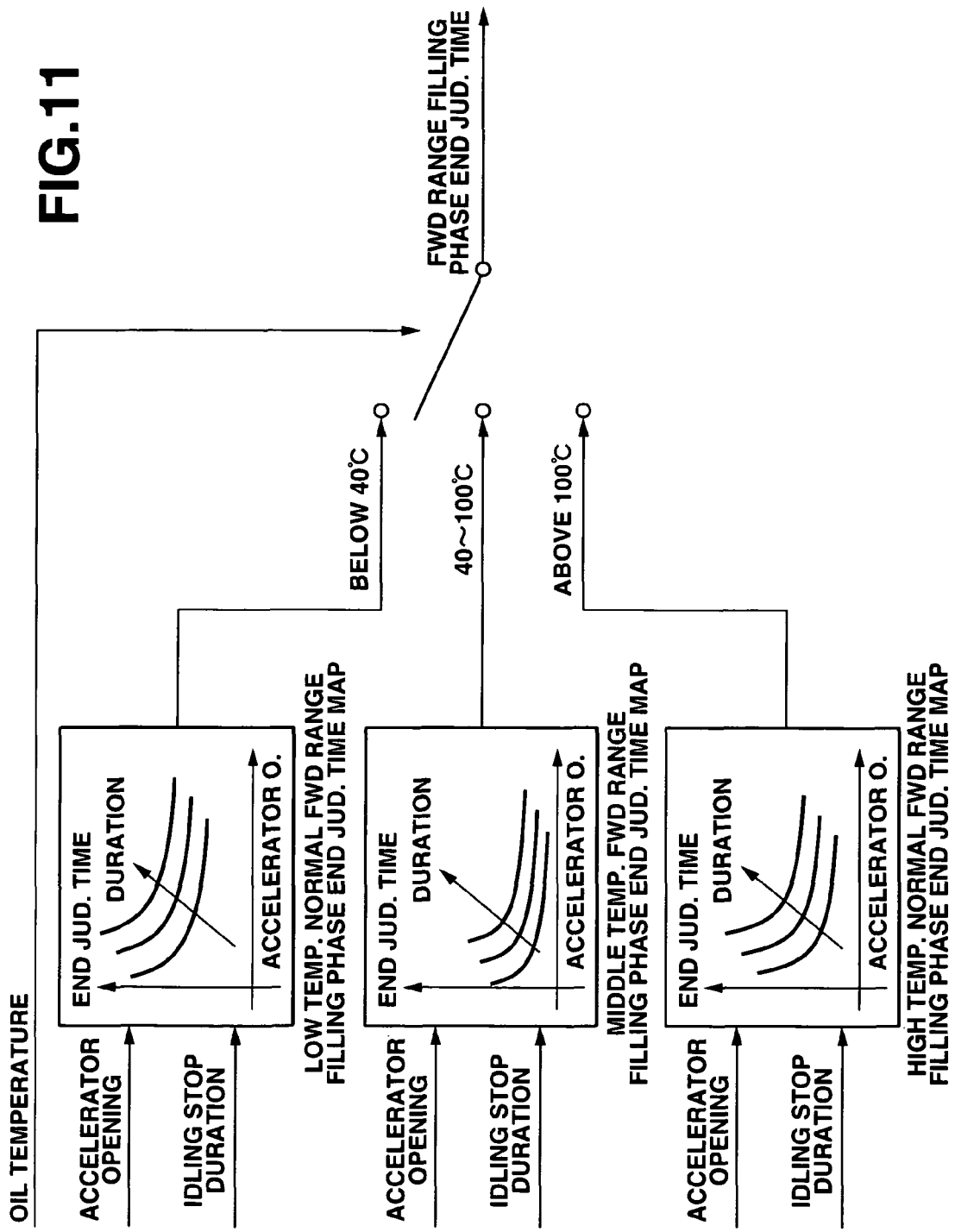
FIG. 11 is filling phase end time judging maps in a low temperature state, in a middle temperature state, and in a high temperature state.

P/N range experience forward range filling phase end judging time map 41 is so set that the filling phase end judging time is longer in the case in which the P range or the N range is selected during the idling stop than in the other cases (as shown in FIG. 10).

The driving system for the vehicle shown in FIG. 1 stops the engine when the engine stop condition is satisfied, and restarts the engine when the engine restart condition is satisfied. When the engine is stopped, the oil pump is stopped. Accordingly, the power can not be transmitted for decrease in the hydraulic pressure supplied to the forward clutch, and there is need to end filling to the forward clutch rapidly at the restart of the engine for generating the driving force of the vehicle immediately.

At this time, if the end judging timing of filling to the clutch is delayed, the generation of driving force is delayed and the generated heat value of the clutch is increased by the acceleration of the engine rotation. Accordingly, there is the possibility of the seizure of the clutch. Moreover, in a case of the fast filling operation to the clutch, the actual clutch pressure is increased rapidly at an actual filling end, and hence the shock is generated.

Moreover, if the filling end judging timing to the clutch is advanced, the pressure is not increased at a level to end filling to the clutch. The shock is generated because the pressure is increased immediately at the end of filling.

Accordingly, there is need to accurately estimate the end of filling the oil to the running clutch.

In the conventional idling stop control, when the engine is stopped, the oil pump connected with the engine is stopped. Accordingly, the oil supplied to the clutch is drained, and the hydraulic pressure is decreased. In the running clutch control at the engine start of the idling stop cancel operation, when the end of filling to the running clutch is judged from the time of the engine start, there is need to estimate a longer time until the end of filling because of the variation in the time from the engine start to the engine first explosion.

Japanese Patent Application Publication No. 2000-266172 shows a control apparatus for a vehicle configured to estimate the end of filling in accordance with an integrated value of the engine speed or a total number of the engine rotation for the improvement in the response at the restart. However, when the cranking is operated by the starter at the rotational speed lower than the idle speed, the oil supply to the running clutch stabilizes after the engine first combustion. Therefore, the line pressure is not increased sufficiently until the engine first combustion, and there is a problem to unable to estimate the end of filling to the running clutch accurately.

On the contrary, in the control apparatus according to the first embodiment of the present invention, the end of filling to running clutch 16 is judged when the filling phase end judging time which is set in accordance with the accelerator opening, the oil temperature, and the idling stop duration, elapses after the secondary pulley pressure exceeds the line pressure command value. Subsequently, CVT controller 4 shifts to the engagement phase.

Because each pulley pressure is proportional to the line pressure, the monitoring of the increase in the pulley pressure is identical to the monitoring of the increase in the line pressure. Therefore, by monitoring the pulley pressure, it is possible to judge a time when the oil supply is initiated stably, that is, when the belt capacity is ensured by the increase in the pulley pressure, when the drain from line pressure regulating valve 23 to clutch source pressure circuit 36 is initiated, and when the hydraulic pressure supplied to running clutch 16 is raised stably.

The control apparatus according to the first embodiment of the present invention has the hydraulic circuit structure arranged to directly supply the discharge pressure (the line pressure) of oil pump 13 through primary pulley pressure regulating valve 24 and secondary pulley pressure regulating valve 25 to the respective pulleys. Each pulley pressure increases prior to the hydraulic pressure to running clutch 16 at the start of the vehicle. Accordingly, the start of the hydraulic pressure supply to running clutch 16 can be judged by monitoring the increase in the pulley pressure. The hydraulic circuit structure according to the first embodiment is provided with primary pressure sensor 31 and secondary pressure sensor 32 to provide the feedback of the respective pulley pressures, and it is possible to estimate timing of start of increase in the clutch pressure without providing another sensing section configured to sense the clutch pressure supplied to running clutch 16.

Because the end of the filling phase is judged by time period while the pulley pressure is increased, it is possible to set the appropriate engagement timing without consideration for variation in time of the hydraulic pressure supply of running clutch 16.

In the control apparatus according to the first embodiment, the pulley pressure command value immediately after the engine start is set to the line pressure command value. At the shift in the normal running state, the line pressure command value is set to a value greater than the pulley pressure command value for enhancing the pulley pressure responsiveness. Accordingly, the pulley pressure is substantially equal to the line pressure because the pulley pressure command value immediately after the engine start is set to the line pressure command value. Therefore, it is possible to sense the increase in the line pressure accurately without providing the line pressure sensor. Consequently, even the system which does not have a running clutch pressure sensor and a turbine sensor can sense that the hydraulic fluid is drained to the clutch source pressure from line pressure regulating valve 23 configured to regulate the pump discharge pressure. Accordingly, it is possible to sense the abrupt start of the hydraulic fluid supply to clutch source pressure circuit 36, and to estimate timing from the abrupt start of the hydraulic fluid supply to running clutch 16, to the end of filling of the hydraulic fluid to running clutch 16. Therefore, it is possible to improve the vehicle-mounted ability, and to reduce the cost and the weight of the apparatus.

Moreover, the line pressure is antecedently supplied to each pulley, and thereby the hydraulic pressure of each pulley can be increased prior to clutch source pressure circuit 36. It is possible to prevent the slip (slippage) of the belt at the restart of the vehicle.

Because the driving force of the vehicle is determined by the transmitting torque of running clutch 16 during the slippage of the running clutch 16, the vehicle falls backwards on the uphill when the brake is disengaged before the clutch pressure increases to the predetermined value (the clutch pressure command value) by filling of the hydraulic fluid of running clutch. Moreover, because the vehicle start is retarded when the release is retarded, the drivability is affected because the shock is generated at the release of brake. Accordingly, the release of the hill hold operation is continued by after the end of the filling phase to end filling of the oil, and it is possible to improve the response at the restart, and to perform the hill hold operation effectively.

During the idling stop, the escape amount of the hydraulic fluid from running clutch 16 is increased as the oil temperature is higher. On the other hand, the time for filling the oil is increased as the oil temperature is lower. Accordingly, it is possible to enhance the accuracy in estimating the filling phase end time by setting the filling phase end judging time of the low oil temperature (below 40°) and the high oil temperature (above 100°) longer than the filling phase end judging time of the middle oil temperature (40°~100°).

As the idling stop duration is longer, the escape amount of the oil from running clutch 16 is increased. Accordingly, it is possible to enhance the accuracy in estimating the filling phase end time by setting the filling phase end judging time longer as the idling stop duration is longer.

The acceleration of the engine rotation varies in accordance with the accelerator opening, and accordingly the increasing speed of the discharge ability of hydraulic pump 13 varies. Moreover, the filling phase command value is varied in accordance with the accelerator opening. Accordingly, the filling phase end judging time is set in accordance with the accelerator opening, and it is possible to enhance the accuracy in estimating the filling phase end judging time, and to reduce the parameters to set the filling phase end judging time.

When the P/N range is selected during the idling stop, the oil in the clutch circuit is drained from manual valve 27, so that an amount of the drained oil is increased and the time for the filling of the oil is increased. Accordingly, when the P/N range is experienced, it is possible to improve the accuracy in estimating the filling end time by setting the filling phase end judging time to be long in the P/N range experience state.

Figure 12:
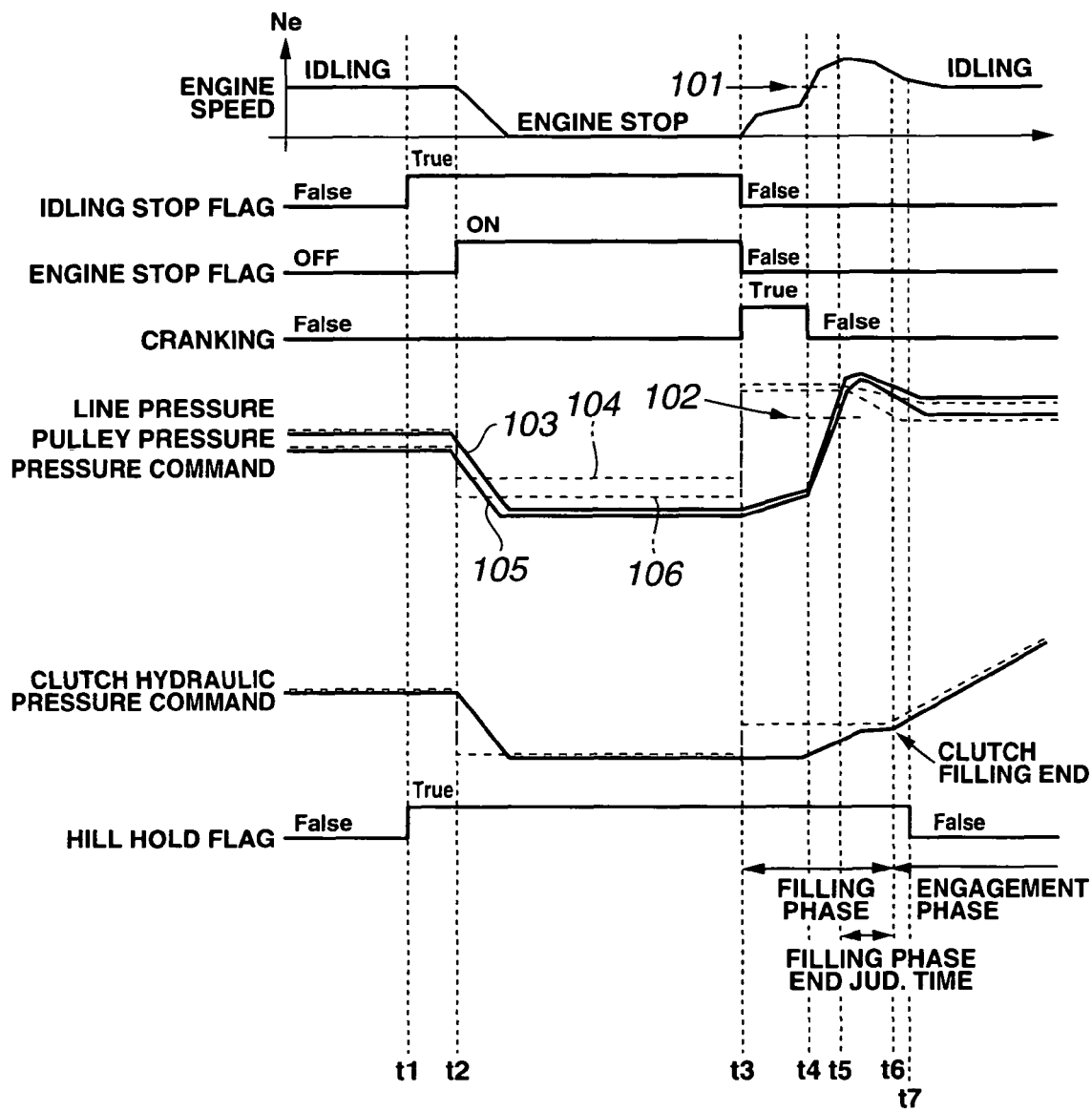
FIG. 12 is a time chart showing running clutch engagement control operation during the idling stop according to the first embodiment of the present invention.

FIG. 12 shows a time chart showing the engagement control operation of the running clutch at the idling stop according to the first embodiment. Numeral 103 indicates the actual line pressure. Numeral 104 indicates the line pressure command value. Numeral 105 indicates the actual primary or secondary pressure. Numeral 106 indicates the primary or secondary pressure command value.

At time t1, the idling stop start condition is satisfied, and the idling stop flag is set to ON. Simultaneously, the hill hold flag is set to ON, and hill hold controller 8 drives hydraulic actuator unit 15 to operate the hill hold.

At time t2, the hill hold operation is finished, and the engine stop flag is set to ON. The engine rotation is stopped by the stop of fuel injection by injector 12, and then the idling stop is started. Accordingly, oil pump 13 is stopped, and the line pressure, the pulley pressure, and the clutch pressure are substantially in the vicinity of zero.

At time t3, the idling stop end condition is satisfied, and the idling stop flag is set to OFF. Simultaneously, the cranking command is transmitted to SSG controller 6, the cranking is started by SSG 5, and injector 12 starts the fuel injection. In this time, the pulley pressure command value is set equal to the line pressure command value, and the clutch pressure command value is set equal to the filling phase command pressure in accordance with the accelerator opening (as shown in FIG. 5). The filling phase is started from this time t3.

At time t4, the engine speed reaches the complete explosion judging predetermined engine speed (indicated by numeral 101 in FIG. 12), and the engine complete explosion is judged. Accordingly, the cranking is ended.

At time t5, the pulley pressure exceeds the line pressure command value as the pulley pressure for judging the start of the supply to clutch (clutch supply start judging pulley pressure indicated by numeral 102 in FIG. 12), and thereby the measure of time of increasing of the hydraulic pressure is started. At this time, each pulley pressure increases to the value capable of ensuring the belt capacity. The drain from line pressure regulating valve 23 to clutch source pressure circuit 36 is started, and the hydraulic pressure supplied to running clutch 16 is increased stably. The line pressure command value and the pulley pressure command value generally return to the respective normal command values.

At time t6, because the filling phase end judging time elapses from time t5, the controller shifts to the engagement phase to start engagement of running clutch 16 by increasing the clutch pressure command value generally from the filling phase command pressure. At this time, the filling to running clutch 16 is finished already, and it is possible to generate the clutch torque. Moreover, the filling phase end judging time is set in accordance with the accelerator opening, the oil temperature, the idling stop duration, the record of the range, and the range. Accordingly, even when the variation in the hydraulic pressure supply to running clutch 16 is generated, it is possible to estimate the end of filling to running clutch 16 accurately, and to shift to the engagement phase in a state in which the clutch torque can be generated. Therefore, it is possible to improve the response at the restart, and to prevent driver's unnatural feeling by suppressing the engagement shock.

At time t7, the hill hold flag is set to OFF by the shift to the engagement phase, and the brake is released.

In the driving system according to the first embodiment, the pulley pressure of CVT 3 is raised earlier than the clutch pressure at the engine restart during the idling stop, and the sensor (secondary pressure sensor 32) to sense the clutch pressure is provided originally. Therefore, the start of filling to the clutch is estimated from the rise in the pulley pressure. Therefore, it is possible to estimate the end of filling to the clutch accurately without providing a sensor for sensing the clutch pressure.

Moreover, the filling phase end judging time is determined in accordance with the accelerator opening, the oil temperature, the duration of the idling stop, the record (history) of the range during the idling stop, and the current range (the forward range or the reverse range). Therefore, it is possible to set the clutch engagement timing adequately irrespective of the variation in the hydraulic pressure supply for the difference in the running condition.

In the hydraulic control apparatus for the automatic transmission according to the first embodiment of the present invention, it is possible to attain effects mentioned below.

The hydraulic control apparatus includes the hydraulic pressure sensing section (secondary pressure sensor 32) configured to sense the hydraulic pressure in CVT 3, and the filling start judging section (step S15) configured to judge whether to start filling to running clutch 16 in accordance with the sensed hydraulic pressure. The engagement pressure control section (step S20) shifts from the filling phase to the engagement phase when the filling phase end judging time elapses from the judgment of the start of the hydraulic pressure supply. Therefore, it is possible to set the optimal clutch engagement timing irrespective of the variation in the hydraulic pressure supply to running clutch 16, and to start the vehicle without causing unnatural feeling to the driver.

The hydraulic control apparatus includes oil temperature sensor 18 configured to sense the oil temperature of oil pan 38. The engagement pressure control section varies the filling phase end judging time in accordance with the sensed oil temperature. Accordingly, it is possible to accurately estimate the filling end time to vary in accordance with the oil temperature.

The control apparatus includes the idling stop duration sensing section configured to sense the idling stop duration from the engine stop to the engine restart. The engagement pressure control section sets the filling phase end judging time longer as the idling stop duration is longer. Therefore, it is possible to more accurately estimate the clutch filling time which needs longer time as the idling stop duration is longer.

The control apparatus includes accelerator opening sensor 9 configured to sense the accelerator opening. The engagement pressure control section varies the filling phase end judging time in accordance with the sensed accelerator opening. Accordingly, the pump discharge ability is varied in accordance with the accelerator opening. Consequently, it is possible to set the filling phase end time more accurately irrespective of varying of the time for the clutch filling.

The engagement pressure control section lengthens the filling phase end judging time when the select lever has shifted to N range or P range during the time from the stop to the restart of the engine. Accordingly, it is possible to accurately estimate the clutch filling time which needs longer time in the P/N range experience state than in the unexperience state.

The hydraulic pressure sensing section senses the line pressure. The filling start judging section judges the start of the filling when the sensed line pressure exceeds the line pressure threshold value. Accordingly, it is possible to judge whether to start filling from clutch pressure regulating valve 26 to running clutch 16 in accordance with the increase in the line pressure.

The automatic transmission is the belt-type continuously-variable transmission (CVT) 3. Secondary pressure sensor 32 senses the pulley pressure of secondary pulley 22. The filling start judging section judges the start of the filling when the sensed pulley pressure exceeds the pulley pressure threshold value (the line pressure command value). Accordingly, it is possible to perform the clutch engaging hydraulic control after the engine restart in the state compensating for the belt slip.

The control apparatus includes primary pulley pressure regulating valve 24 and secondary pulley pressure regulating valve 25 configured to regulate the respective pulley pressures by decompressing the line pressure. In these primary and secondary pulley pressure regulating valves 24 and 25, the filling pressure command value immediately after the engine restart is set to the line pressure command value, and the pulley pressure threshold value is set to the line pressure command value. Accordingly, it is possible to monitor the line pressure without providing the line pressure sensor. Moreover, it is possible to supply the line pressure to the pulley by priority, to increase the pulley pressure prior to clutch source pressure circuit 36, and to prevent the belt slip (slippage).

The control apparatus includes hill hold controller 8 configured to hold brake fluid pressure of each wheel until the shift to engagement phase when engine 1 is stopped by idling stop controller 7. Accordingly, it is possible to perform the hill hold function effectively with enhancing the response at the restart.

Figure 13:
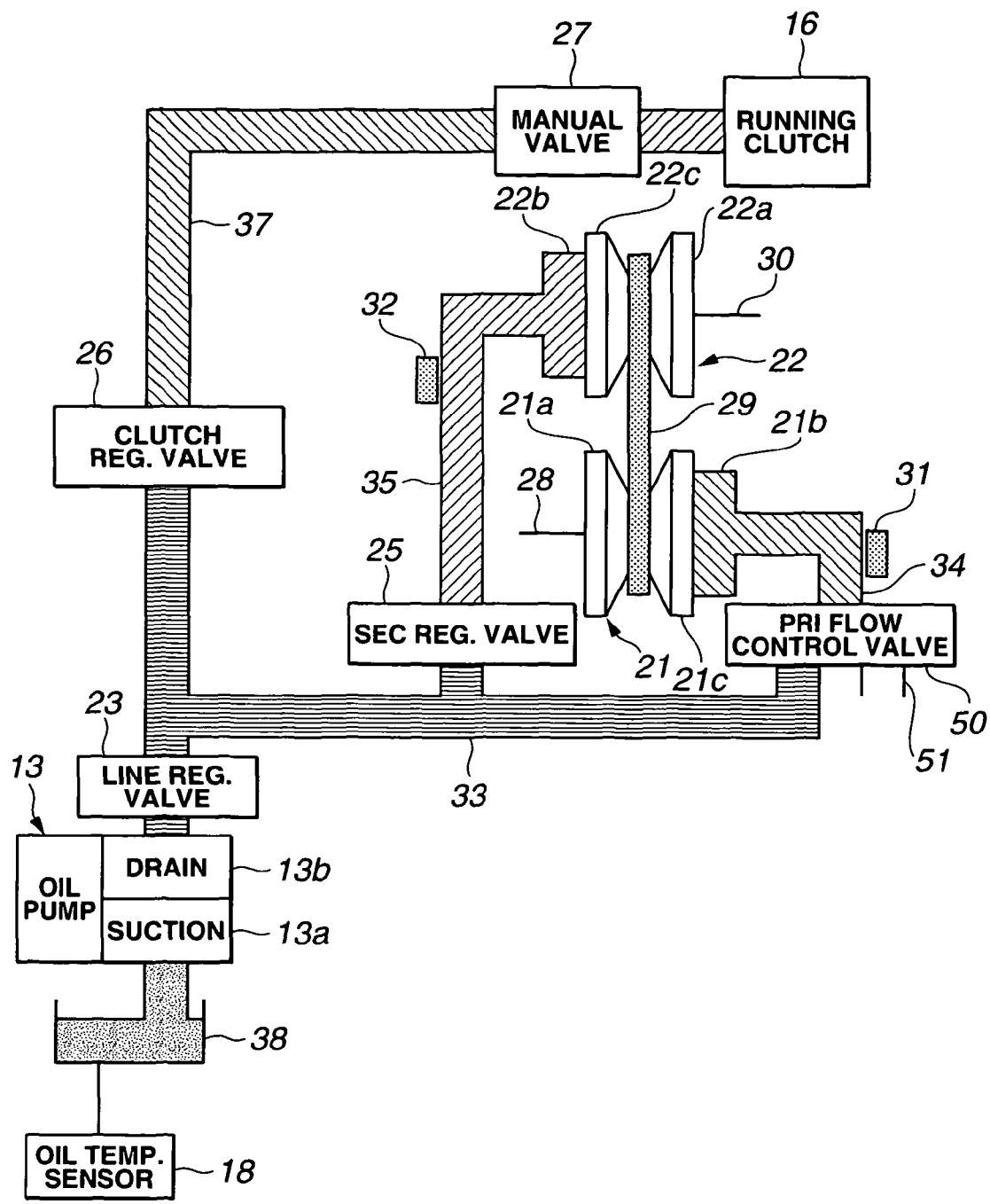
FIG. 13 is a view showing a hydraulic circuit arrangement of CVT 3 according to a second embodiment of the present invention.

FIG. 13 shows a hydraulic circuit arrangement of CVT 3 according to the second embodiment. The hydraulic circuit arrangement of FIG. 13 is substantially identical to the arrangement of FIG. 2 in most aspects as shown by the use of the same reference numerals. Unlike the first example, the second practical example employs a primary flow control valve 50 configured to vary the primary pulley pressure of primary pulley 21.

This primary flow regulating valve 50 is arranged to vary an opening area between line pressure circuit (hydraulic pressure supply circuit) 33 and primary pressure circuit 34, and to vary an opening area between primary pressure circuit 34 and a drain circuit (hydraulic pressure discharge circuit) 51, and thereby to vary the primary pulley pressure. This primary pulley pressure is controlled (regulated) by a primary pulley flow rate command value from CVT controller (control valve control section) 4.

Figure 14:
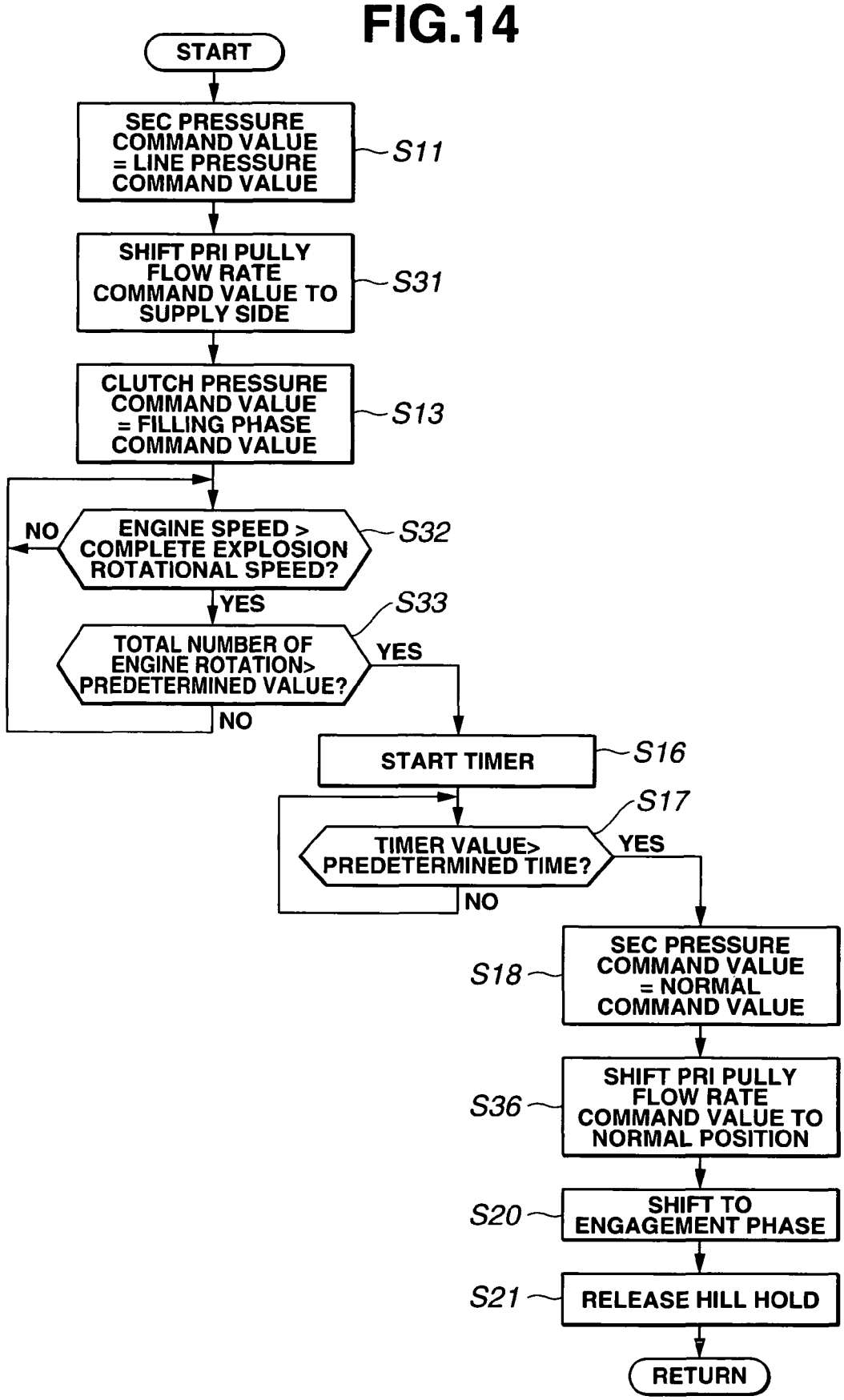
FIG. 14 is a flow chart showing operation of the running clutch engagement control performed by CVT controller 4, according to the second embodiment of the present invention, when the idling stop end condition is satisfied.

FIG. 14 shows a flow chart showing a flow of the running clutch engagement control process performed by CVT controller 4 when the idling stop end condition is satisfied, according to the second embodiment of the present invention. The process of FIG. 14 is substantially identical to the process of FIG. 4 in most aspects as shown by the use of the same reference numerals.

At step S31, CVT controller 4 shifts the primary pulley flow rate command value to primary flow rate control valve 50, to the supply side to be fully open, and the process proceeds to step S13. "Shift to the supply side to be fully open" indicates that the opening area between line pressure circuit 33 and primary pressure circuit 34 in primary flow rate control valve 50 is maximized, and that the opening area between primary pressure circuit 34 and drain circuit 51 is minimized.

At step S32, CVT controller 4 reads the engine speed, and judges whether the engine speed exceeds a complete explosion judging engine speed or not. When the answer of step S32 is YES, the process proceeds to step 533. When the answer of step S32 is NO, the process repeats step S32. CVT controller 4 sets the complete explosion judging engine speed in accordance with the oil temperature and the idling stop duration.

At step S33, CVT controller 4 judges whether an integrated value of the engine speed (or total number of the engine rotation) exceeds an engine complete explosion judging total rotation number or not. When the answer of step S33 is YES, the process proceeds to step S16. When the answer of step S33 is No, the process proceeds to step S32. CVT controller 4 sets the engine complete explosion judging total rotation number in accordance with the oil temperature and the idling stop duration. Steps S32 and S33 correspond to the filling start judging section to judge the end of the filling to running clutch 16.

At step S36, CVT controller 4 returns primary flow rate control valve 50 to an intermediate position between the supply side and the discharge side, and the process proceeds to step S20.

In the flow chart of FIG. 14, in the case of the start of the oil supply, the process proceeds to step S11, step S31, step S13, step S32, step S33, step S16, and step S17. At step S17, when the filling phase end judging time which is set in accordance with the accelerator opening, the oil temperature, the idling stop duration, the record of the range during the idling stop, and the current range, elapses after the oil supply is initiated, the process proceeds to step S18, step S36, and step S20 and shifts to the engagement phase. CVT controller 4 shifts to the engagement phase at step S20. Subsequently, CVT controller 4 releases the hill hold at step S21.

Figure 15:
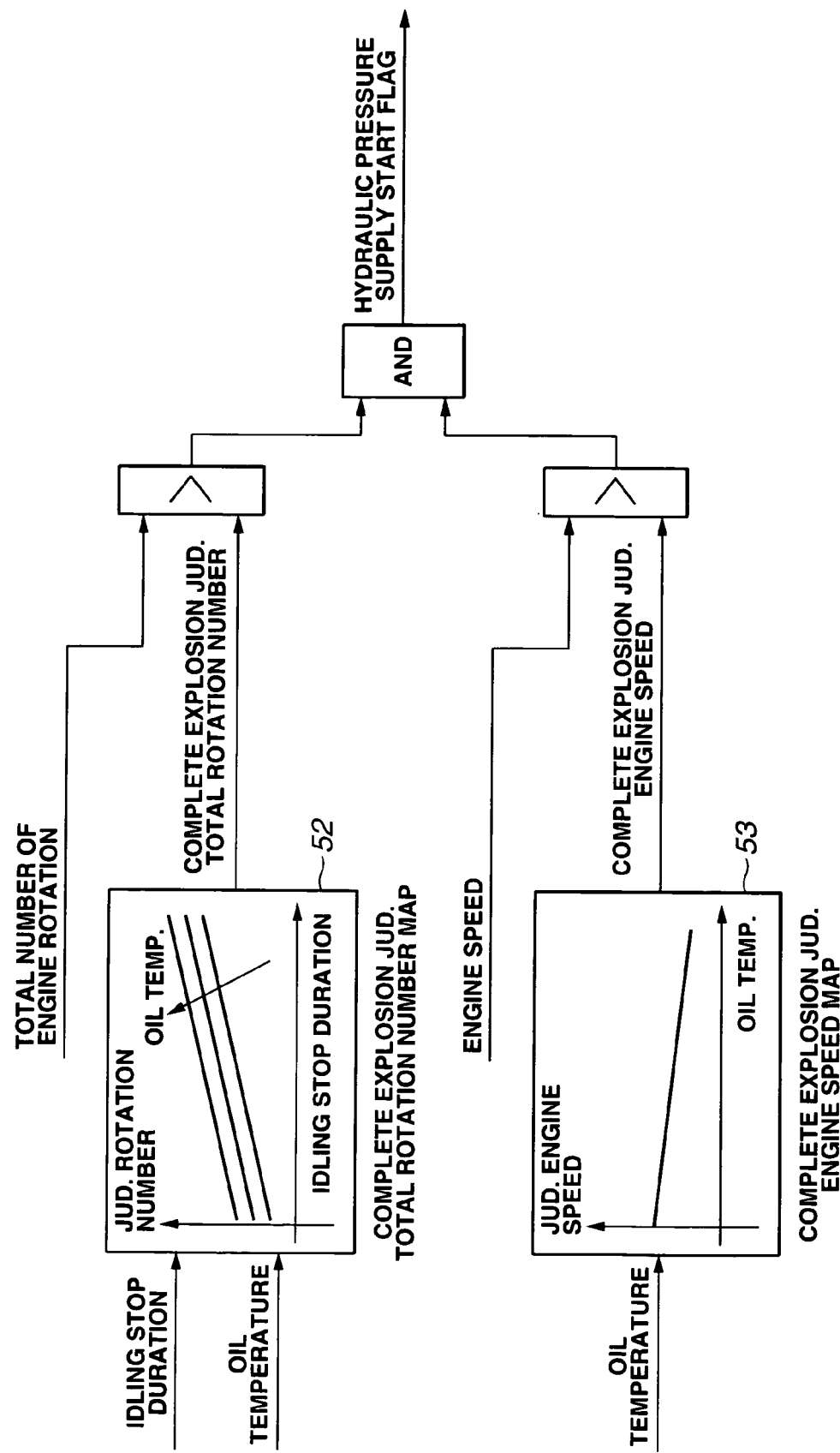
FIG. 15 is a complete explosion judging engine speed map and an engine complete explosion judging total rotation number map.

As shown in FIG. 15, the engine complete explosion judging total rotation number is set by using an engine complete explosion judging total rotation number map 52. The engine complete explosion judging total rotation number is set to be increased as the oil temperature is higher. Moreover, the engine complete explosion judging total rotation number is set to be increased as the idling stop duration is longer.

The complete explosion judging engine speed is set by using a complete explosion judging engine speed map 53. The complete explosion judging engine speed is set to be lower as the oil temperature is higher.

To increase the line pressure to start the filling to running clutch 16, the filling of the oil to line pressure circuit 33 needs to be ended, and the discharge ability of oil pump 13 needs to be increased by the increase in the engine speed.

The amount of the oil escaped from line pressure circuit 33 can supply even by the low pressure at the cranking, and the end of filling to line pressure circuit 33 can be judged by the total number of the engine rotation. Therefore, it is possible to estimate the time of start of the oil supply more accurately by monitoring the engine speed and that total number of the engine rotation.

Figure 16:
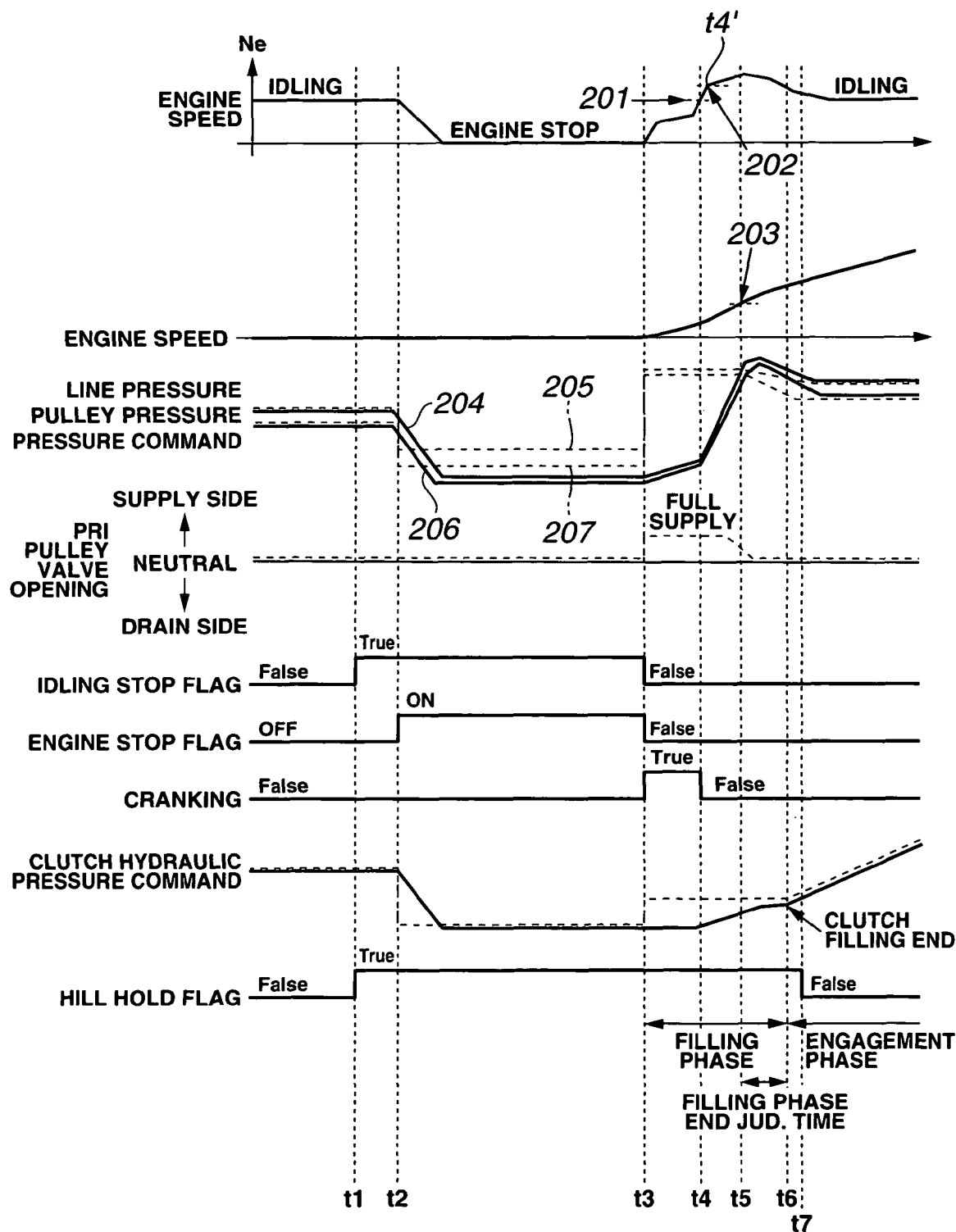
FIG. 16 is a time chart showing running clutch engagement control operation during the idling stop according to the second embodiment of the present invention.

FIG. 16 shows a time chart showing the engaging control operation of the running clutch at the idling stop according to the second embodiment. Numeral 103 indicates the actual line pressure. Numeral 204 indicates the actual line pressure. Numeral 205 indicates the actual primary or secondary pressure. Numeral 206 indicates the actual primary or secondary pressure. Numeral 207 indicates the primary or secondary pressure command value.

At time t3, the idling stop end condition is satisfied, and the idling stop flag is set to OFF. At the same time, the cranking command is transmitted to SSG controller 6, the cranking is started by SSG 5, and injector 12 starts the fuel injection. At this time, primary flow rate control valve 50 is fully opened to the supply side, the secondary pulley pressure command value is set equal to the line pressure command value, and the clutch pressure command value is set to the filling phase command pressure (shown in FIG. 5) according to the accelerator opening. From this time t3, the filling phase is started.

At time t4, the engine speed reaches to the complete explosion judging predetermined engine speed 201, and the engine complete explosion is judged. Accordingly, the cranking is ended.

At time t4', the engine speed exceeds the complete explosion judging engine speed 202. However, the total number of the engine rotation is lower than engine complete explosion judging total rotation number. Accordingly, the control apparatus judges that the oil supply to running clutch 16 is not initiated. At this time, the discharge ability of hydraulic pump 13 is increased sufficiently, and however the oil supply to line pressure circuit 33 is not ended.

At time t5, the total number of the engine rotation exceeds the engine complete explosion judging total rotation number 203, and the start of the oil supply to running clutch 16 is judged. The measuring of the oil supply duration is initiated. At this time, each pulley pressure is increased at level to ensure the belt capacity. The drain from line pressure regulating valve 23 to clutch source pressure circuit 36 is initiated, and the hydraulic pressure supply to running clutch 16 is raised stably. The line pressure command value and the secondary pulley pressure command value generally return to respective normal command values, and primary flow rate control valve 50 returns to the neutral position.

At time t6, the filling phase end judging time elapses from time t5, the clutch pressure command value is increased gradually from the filling phase command pressure, CVT controller 4 shifts to the engagement phase to initiate the engagement of running clutch 16. At this time, the filling to running clutch 16 is finished already, and the clutch torque can be generated. The filling phase end judging time is set in accordance with the accelerator opening, the oil temperature, the idling stop duration, the range record, and the current range. Accordingly, even when the variation in the hydraulic pressure supply to running clutch 16 is generated, it is possible to estimate the end of the filling to running clutch 16 accurately, and thereby to shift to the engagement phase in a state capable of generating the clutch torque. Therefore, it is possible to enhance the response at the restart, and to prevent the unnatural feeling to the driver by suppressing the engagement shock.

In the hydraulic control apparatus for the automatic transmission according to the second embodiment of the present invention, it is possible to attain effects mentioned below.

The hydraulic control apparatus includes engine rotation sensor 10 to sense the engine speed, the filling start judging section (step S33 and step S34), and the engagement pressure control section (step 20). The filling start judging section judges the start of the filling when the sensed engine speed is greater than the complete explosion judging engine speed, and when that total number of engine rotation exceeds the engine complete explosion judging total engine rotation. The engagement pressure control section shifts from the filling phase to the engagement phase when the filling phase end judging time elapses from the judgment of the start of the hydraulic pressure supply. Accordingly, it is possible to estimate the start of the filling to running clutch 16 accurately by the engine speed (engine rotation).

The hydraulic control apparatus for the automatic transmission includes primary flow rate control valve 50 arranged to vary valve openings of the hydraulic pressure supply circuit and the hydraulic pressure discharge circuit to the primary pulley, and CVT controller 4 configured to control transmission ratio by varying the valve openings of supply side and discharge side of primary flow rate control valve 50. CVT controller 4 is configured to maximize primary flow rate control valve 50 to the supply side until the judgment of the start of the filling after the engine restart. Accordingly, it is possible to monitor the state of the line pressure without providing the line pressure sensor. Moreover, it is possible to increase the pulley pressure prior to clutch pressure circuit 37 by supplying the line pressure to the pulley by priority, and to prevent the belt slippage.

The control apparatus according to first and second embodiments is applied to the belt type continuously-variable automatic transmission as the automatic transmission. The control apparatus according to the first and second embodiments of the present invention are applicable to the automatic transmission and the other continuously-variable automatic transmissions such as a troidal type continuously variable automatic transmission.

In the hydraulic control apparatus according to the first embodiment of the present invention, the pulley pressure increase is judged in accordance with the pulley pressure of the secondary pulley. Moreover, the increase in the pulley pressure may be judged in accordance with the primary pulley pressure or both of the primary and secondary pulley pressures.

This application is based on a prior Japanese Patent Application No. 2005-046129. The entire contents of the Japanese Patent Application No. 2005-046129 with a filing date of Feb. 22, 2005 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A hydraulic control apparatus for an automatic transmission of a vehicle, the control apparatus comprising:
    an oil pump driven by an engine;
    a forward clutch arranged to be changed over from a disengagement state to an engagement state by an engagement pressure from the oil pump at a start of the engine;
    an idling stop control section configured to stop the engine at a stop of the vehicle when a predetermined condition is satisfied, and to restart the engine when the predetermined condition is not satisfied;
    a hydraulic pressure sensing section configured to sense a hydraulic pressure in the automatic transmission;
    a filling start judging section configured to judge a start of filling to the forward clutch in accordance with the sensed hydraulic pressure;
    an oil temperature sensing section configured to sense an oil temperature in the automatic transmission; and
    an engagement pressure control section configured
        to control the engagement pressure to output a filling pressure command value until an end of a piston stroke of the forward clutch in a filling phase, and then to hold clutch plates in a slip state after the end of the piston stroke of the forward clutch in an engagement phase when the forward clutch is changed over from the disengagement state to the engagement state,
        to shift from the filling phase to the engagement phase when a predetermined time elapses from the judgment of the start of the filling to the forward clutch, and
        to vary the predetermined time in accordance with the sensed oil temperature.

2. A hydraulic control apparatus for an automatic transmission of a vehicle, the control apparatus comprising:
    an oil pump driven by an engine;
    a forward clutch arranged to be changed over from a disengagement state to an engagement state by an engagement pressure from the oil pump at a start of the engine;
    an idling stop control section configured to stop the engine at a stop of the vehicle when a predetermined condition is satisfied, and to restart the engine when the predetermined condition is not satisfied;
    a hydraulic pressure sensing section configured to sense a hydraulic pressure in the automatic transmission;
    a filling start judging section configured to judge a start of filling to the forward clutch in accordance with the sensed hydraulic pressure;
    an idling stop duration sensing section configured to sense an idling stop duration from the stop of the engine to the restart of the engine; and
    an engagement pressure control section configured
        to control the engagement pressure to output a filling pressure command value until an end of a piston stroke of the forward clutch in a filling phase, and then to hold clutch plates in a slip state after the end of the piston stroke of the forward clutch in an engagement phase when the forward clutch is changed over from the disengagement state to the engagement state, and
        to shift from the filling phase to the engagement phase when a predetermined time elapses from the judgment of the start of the filling to the forward clutch, and
    wherein the engagement pressure control section sets the predetermined time longer as the idling stop duration is longer.

3. A hydraulic control apparatus for an automatic transmission of a vehicle, the control apparatus comprising:
    an oil pump driven by an engine;
    a forward clutch arranged to be changed over from a disengagement state to an engagement state by an engagement pressure from the oil pump at a start of the engine;
    an idling stop control section configured to stop the engine at a stop of the vehicle when a predetermined condition is satisfied, and to restart the engine when the predetermined condition is not satisfied;
    a hydraulic pressure sensing section configured to sense a hydraulic pressure in the automatic transmission;
    a filling start judging section configured to judge a start of filling to the forward clutch in accordance with the sensed hydraulic pressure;
    an accelerator input quantity sensing section configured to sense an input quantity of an accelerator; and
    an engagement pressure control section configured
        to control the engagement pressure to output a filling pressure command value until an end of a piston stroke of the forward clutch in a filling phase, and then to hold clutch plates in a slip state after the end of the piston stroke of the forward clutch in an engagement phase when the forward clutch is changed over from the disengagement state to the engagement state,
        to shift from the filling phase to the engagement phase when a predetermined time elapses from the judgment of the start of the filling to the forward clutch, and
        to vary the predetermined time in accordance with the sensed input quantity of the accelerator.

4. A hydraulic control apparatus for an automatic transmission of a vehicle, the control apparatus comprising:
    an oil pump driven by an engine;
    a forward clutch arranged to be changed over from a disengagement state to an engagement state by an engagement pressure from the oil pump at a start of the engine;
    an idling stop control section configured to stop the engine at a stop of the vehicle when a predetermined condition is satisfied, and to restart the engine when the predetermined condition is not satisfied;
    a hydraulic pressure sensing section configured to sense a hydraulic pressure in the automatic transmission;
    a filling start judging section configured to judge a start of filling to the forward clutch in accordance with the sensed hydraulic pressure; and
    an engagement pressure control section configured
        to control the engagement pressure to output a filling pressure command value until an end of a piston stroke of the forward clutch in a filling phase, and then to hold clutch plates in a slip state after the end of the piston stroke of the forward clutch in an engagement phase when the forward clutch is changed over from the disengagement state to the engagement state, to shift from the filling phase to the engagement phase when a predetermined time elapses from the judgment of the start of the filling to the forward clutch, and wherein the engagement pressure control section sets the predetermined time longer when a select lever is shifted to one of a neutral range and a stop range during a time from the stop of the engine to the restart of the engine.

5. A hydraulic control apparatus for an automatic transmission of a vehicle, the control apparatus comprising:

an oil pump driven by an engine;

a forward clutch arranged to be changed over from a disengagement state to an engagement state by an engagement pressure from the oil pump at a start of the engine;

an idling stop control section configured to stop the engine at a stop of the vehicle when a predetermined condition is satisfied, and to restart the engine when the predetermined condition is not satisfied;

a hydraulic pressure sensing section configured to sense a hydraulic pressure in the automatic transmission;

a filling start judging section configured to judge a start of filling to the forward clutch in accordance with the sensed hydraulic pressure; and an engagement pressure control section configured to control the engagement pressure to output a filling pressure command value until an end of a piston stroke of the forward clutch in a filling phase, and then to hold clutch plates in a slip state after the end of the piston stroke of the forward clutch in an engagement phase when the forward clutch is changed over from the disengagement state to the engagement state, to shift from the filling phase to the engagement phase when a predetermined time elapses from the judgment of the start of the filling to the forward clutch, and to sense a line pressure, and wherein the filling start judging section judges the start of the filling when the sensed line pressure is greater than a line pressure threshold value.

6. The hydraulic control apparatus as claimed in claim 5, wherein the automatic transmission is a belt continuously variable automatic transmission; the hydraulic pressure sensing section senses at least one of a pulley pressure of a primary pulley and a pulley pressure of a secondary pulley; and the filling start judging section judges the start of the filling when the sensed pulley pressure is greater than a pulley pressure threshold value.

7. The hydraulic control apparatus as claimed in claim 6, wherein the hydraulic control apparatus further comprises:

a pulley pressure regulating section configured to regulate one of the pulley pressure of the primary pulley and the pulley pressure of the secondary pulley by decreasing the line pressure, wherein the filling pressure command value after the restart of the engine is equal to or greater than the line pressure command value, and the pulley pressure threshold value of the pulley pressure regulating section equal to the line pressure command value.

8. The hydraulic control apparatus as claimed in claim 6, wherein the hydraulic control apparatus further comprises:

a flow rate regulating valve to vary an area of a hydraulic pressure supply circuit to one of the primary pulley and the secondary pulley and an area of a hydraulic discharge circuit; and a regulating valve control section to control a transmission ratio by varying a valve opening on a supply side and a valve opening on a discharge side of the flow rate regulating valve, and wherein the regulating valve control section maximizes the flow rate regulating valve to the supply side until the start of the filling is judged after the restart of the engine.

9. The hydraulic control apparatus as claimed in claim 5, further comprising a motor generator controller in communication with the idling stop control section.

10. The hydraulic control apparatus as claimed in claim 5, wherein the engine includes a throttle.

11. A hydraulic control apparatus for an automatic transmission of a vehicle, the control apparatus comprising:

an oil pump driven by an engine;

a forward clutch arranged to be changed over from a disengagement state to an engagement state by an engagement pressure from the oil pump at a start of the engine;

an idling stop control section configured to stop the engine at a stop of the vehicle when a predetermined condition is satisfied, and to restart the engine when the predetermined condition is not satisfied;

a hydraulic pressure sensing section configured to sense a hydraulic pressure which is a line pressure being a source of the forward clutch, and which is supplied to a predetermined portion in the automatic transmission;

a filling start judging section configured to judge a start of filling to the forward clutch in accordance with the sensed hydraulic pressure; and an engagement pressure control section configured to control the engagement pressure to output a filling pressure command value until an end of a piston stroke of the forward clutch in a filling phase, and then to hold clutch plates in a slip state after the end of the piston stroke of the forward clutch in an engagement phase when the forward clutch is changed over from the disengagement state to the engagement state, and to shift from the filling phase to the engagement phase when a predetermined time elapses from a judgment of the start of the filling to the forward clutch, wherein the hydraulic control apparatus further comprises a hill hold control section to hold a brake hydraulic pressure of each wheel until shift to the engagement phase when the idling stop control section stops the engine.

12. A hydraulic control apparatus for an automatic transmission of a vehicle, the control apparatus comprising:

an oil pump driven by an engine;

a forward clutch arranged to be changed over from a disengagement state to an engagement state by an engagement pressure from the oil pump at a start of the engine;

an idling stop control section configured to stop the engine at a stop of the vehicle when a predetermined condition is satisfied, and to restart the engine when the predetermined condition is not satisfied;

an engine speed sensing section configured to sense an engine speed;

a filling start judging section configured to judge a start of filling to the forward clutch when the sensed engine speed is greater than a first predetermined value and when an integrated value of the sensed engine speed is greater than a second predetermined value; and an engagement pressure control section configured to control the engagement pressure to output a filling pressure command value until an end of a piston stroke of the forward clutch in a filling phase, and then to hold clutch plates in a slip state after the end of the piston stroke of the forward clutch in an engagement phase when the forward clutch is changed over from the disengagement state to the engagement state, and to shift from the filling phase to the engagement phase when a predetermined time elapses from the judgment of the start of the filling to the forward clutch.

13. The hydraulic control apparatus as claimed in claim 12, wherein the hydraulic control apparatus further comprises:

a flow rate regulating valve to vary an area of a hydraulic pressure supply circuit to one of a primary pulley and a secondary pulley and an area of a hydraulic discharge circuit; and a regulating valve control section to control a transmission ratio by varying a valve opening on a supply side and a valve opening on a discharge side of the flow rate regulating valve, and wherein the regulating valve control section maximizes the flow rate regulating valve to the supply side until the start of the filling is judged after the restart of the engine.

14. The hydraulic control apparatus as claimed in claim 12, wherein the hydraulic control apparatus further comprises a hill hold control section to hold a brake hydraulic pressure of each wheel until shift to the engagement phase when the idling stop control section stops the engine.

15. A hydraulic control method for an automatic transmission of a vehicle including an oil pump driven by an engine, and a forward clutch arranged to be changed over from a disengagement state to an engagement state by an engagement pressure from the oil pump at a start of the engine, the control method comprising:

stopping the engine at a stop of the vehicle when a predetermined condition is satisfied;

restarting the engine when the predetermined condition is not satisfied;

sensing a hydraulic pressure which is a line pressure being a source pressure of the forward clutch, and which is supplied to a predetermined portion in the automatic transmission;

judging a start of filling to the forward clutch in accordance with the sensed hydraulic pressure;

controlling the engagement pressure to output a filling pressure command value until an end of a piston stroke of the forward clutch in a filling phase, and then to hold clutch plates in a slip state after the end of the piston stroke of the forward clutch in an engagement phase when the forward clutch is changed over from the disengagement state to the engagement state;

shifting from the filling phase to the engagement phase when a predetermined time elapses from the judgment of the start of the filling to the forward clutch;

sensing a line pressure; and judging the start of the filling when the sensed line pressure is greater than a line pressure threshold value.

16. The hydraulic control method as claimed in claim 15, further comprising controlling a motor generator using a motor generator controller in communication with an idling stop control section.

17. The hydraulic control method as claimed in claim 15, wherein the engine includes a throttle, the method further comprising opening the throttle.

* * * * *